United States Patent
Ceder et al.

(10) Patent No.: US 11,769,876 B2
(45) Date of Patent: Sep. 26, 2023

(54) CATION-DISORDERED ROCKSALT LITHIUM MANGANESE OXIDES OR OXYFLUORIDES

(71) Applicant: The Regents of the University of California, Oakland, CA (US)

(72) Inventors: Gerbrand Ceder, Orinda, CA (US); Zhengyan Lun, Albany, CA (US); Bin Ouyang, Richmond, CA (US)

(73) Assignee: THE REGENTS OF THE UNIVERSITY OF CALIFORNIA, Oakland (CA)

( * ) Notice: Subject to any disclaimer, the term of this patent is extended or adjusted under 35 U.S.C. 154(b) by 244 days.

(21) Appl. No.: 16/990,157

(22) Filed: Aug. 11, 2020

(65) Prior Publication Data

US 2021/0050592 A1 Feb. 18, 2021

Related U.S. Application Data

(60) Provisional application No. 62/885,908, filed on Aug. 13, 2019.

(51) Int. Cl.
*H01B 1/08* (2006.01)
*H01M 4/505* (2010.01)
(Continued)

(52) U.S. Cl.
CPC .......... *H01M 4/505* (2013.01); *C01G 45/006* (2013.01); *H01B 1/08* (2013.01); *H01M 4/1315* (2013.01);
(Continued)

(58) Field of Classification Search
CPC .......... H01B 1/06; H01B 1/08; C01G 45/006; C01G 45/02; H01M 4/0471; H01M 4/505; H01M 4/1315
See application file for complete search history.

(56) References Cited

U.S. PATENT DOCUMENTS

| | | |
|---|---|---|
| 10,199,647 B2 | 2/2019 | Chen et al. |
| 2010/0183925 A1 | 7/2010 | Manthiram et al. |

(Continued)

FOREIGN PATENT DOCUMENTS

| | | |
|---|---|---|
| WO | 2018/187531 A1 | 10/2018 |
| WO | 2019/060301 A1 | 3/2019 |
| WO | WO 2022/044554 A1 * | 3/2022 |

OTHER PUBLICATIONS

House et al "Lithium manganese oxyfluoride as a new cathode material exhibiting oxygen redox", Energy Environ. Sci., 2018, 11, 926.*

(Continued)

*Primary Examiner* — Mark Kopec
(74) *Attorney, Agent, or Firm* — Smith, Gambrell & Russell, LLP

(57) ABSTRACT

A class of compositions in the Li—Mn—O—F chemical space for Li-ion cathode materials. The compositions are cobalt-free, high-capacity Li-ion battery cathode materials synthesized with cation-disordered rocksalt (DRX) oxide or oxyfluorides, with the general formula $Li_xMn_{2-x}O_{2-y}F_y$ ($1.1 \le x \le 1.3333$; $0 \le y \le 0.6667$). The compositions are characterized by: (i) high capacities (e.g., >240 mAh/g); (ii) high energy densities (e.g., >750 Wh/kg between 1.5-4.8V); (iii) favorable cyclability; and (iv) low cost.

43 Claims, 16 Drawing Sheets

(51) Int. Cl.
  C01G 45/00       (2006.01)
  H01M 4/1315      (2010.01)
  H01M 4/62        (2006.01)
  H01M 10/0525     (2010.01)
  H01M 4/02        (2006.01)

(52) U.S. Cl.
  CPC ....... *H01M 4/623* (2013.01); *H01M 10/0525* (2013.01); *C01P 2002/72* (2013.01); *C01P 2002/76* (2013.01); *C01P 2002/77* (2013.01); *C01P 2002/78* (2013.01); *C01P 2004/03* (2013.01); *C01P 2004/04* (2013.01); *C01P 2006/40* (2013.01); *H01M 2004/028* (2013.01)

(56) References Cited

U.S. PATENT DOCUMENTS

2017/0244103 A1* 8/2017 Natsui .................. C01G 51/50
2018/0090757 A1* 3/2018 Ikeuchi ............. H01M 10/0525
2019/0221838 A1* 7/2019 Ishikawa ............... H01M 4/525

OTHER PUBLICATIONS

Lun et al "Design principles for high-capacity Mn-based cation-disordered rocksalt cathodes", Chem 6, 153-168, Jan. 9, 2020.*
Kang, B., et al. Battery materials for ultrafast charging and discharging. *Nature* 458, 190 (2009).
P. Barpanda, et al. A 3.90 V iron-based fluorosulphate material for lithium-ion batteries crystallizing in the triplite structure. *Nature materials* 10, 772-779 (2011).
Kang, K., et al. Electrodes with high power and high capacity for rechargeable lithium batteries. *Science* 311, 977-980 (2006).
Freire, M. et al. A new active Li—Mn—O compound for high energy density Li-ion batteries. *Nature materials* 15, 173-178 (2016).
House, R. A. et al. Lithium manganese oxyfluoride as a new cathode material exhibiting oxygen redox. *Energy & Environmental Science* 11, 926-932 (2018).
Lee, J. et al. Reversible $Mn^{2+}/Mn^{4+}$ double redox in lithium-excess cathode materials. *Nature* 556, 185-190, (2018).
Kitchaev, D. A. et al. Design principles for high transition metal capacity in disordered rocksalt Li-ion cathodes. *Energy & Environmental Science* 11, 2159-2171, (2018).
Lee, J. et al. Unlocking the potential of cation-disordered oxides for rechargeable lithium batteries. *Science* 343, 519-522 (2014).
Glazier, S, et al. Characterization of disordered $Li_{(1+x)\ Ti2x} Fe_{(1-3x)\ O2}$ as positive electrode materials in Li-Ion batteries using percolation theory. *Chemistry of Materials* 27, 7751-7756 (2015).
Chen, R. et al. Disordered Lithium-Rich Oxyfluoride as a Stable Host for Enhanced Li+ Intercalation Storage. *Advanced Energy Materials* 5, 1401814, 1-7 (2015).
Lun, Z. et al. Improved Cycling Performance of Li-Excess Cation-Disordered Cathode Materials upon Fluorine Substitution. *Advanced Energy Materials* 9, 1802959, 1-11 (2019).
Hoshino, S. et al. Reversible three-electron redox reaction of Mo3+/Mo6+ for rechargeable lithium batteries. *ACS Energy Letters* 2, 733-738 (2017).
Yabuuchi, N. et al. High-capacity electrode materials for rechargeable lithium batteries: $Li_3NbO_4$-based system with cation-disordered rocksalt structure. *Proceedings of the National Academy of Sciences* 112, 7650-7655, (2015).
Lee, J. et al. Mitigating oxygen loss to improve the cycling performance of high capacity cation-disordered cathode materials. *Nature communications* 8, 981, 1-10 (2017).
Ji, H. et al. Hidden structural and chemical order controls lithium transport in cation-disordered oxides for rechargeable batteries. *Nature Communications* 10, 592, 1-9, (2019).
Clément, R. J., et al. Short-Range Order and Unusual Modes of Nickel Redox in a Fluorine-Substituted Disordered Rocksalt Oxide Lithium-Ion Cathode. *Chemistry of Materials* 30, 6945-6956, (2018).
Kan, W. H. et al. Understanding the Effect of Local Short-Range Ordering on Lithium Diffusion in $Li_{1.3}Nb_{0.3}Mn_{0.4}O_2$ Single-Crystal Cathode. *Chem.* 4, 2108-2123, (2018).
Urban, A., et al. The Configurational Space of Rocksalt-Type Oxides for High-Capacity Lithium Battery Electrodes. *Advanced Energy Materials* 4, 1-9 (2014).
Richards, W. D., et al. Fluorination of Lithium-Excess Transition Metal Oxide Cathode Materials. *Advanced Energy Materials* 8, 1701533, 1-7 (2018).
Nelson, L. J., et al. Compressive sensing as a paradigm for building physics models. *Physical Review B* 87, 035125, 1-12, (2013).
Kresse, G., et al. Efficiency of ab-initio total energy calculations for metals and semiconductors using a plane-wave basis set. *Computational Materials Science* 6, 15-50, (1996).
Kresse, G., et al. From ultrasoft pseudopotentials to the projector augmented-wave method. *Physical Review B* 59, 1758-1775, (1999).
Dudarev, S., et al. Electron-energy-loss spectra and the structural stability of nickel oxide: An LSDA+U study. *Physical Review B* 57, 1505-1509, (1998).
Wang, L., et al. Oxidation energies of transition metal oxides within the GGA+U framework. *Physical Review B* 73, 195107, 1-6, (2006).
Metropolis, N., et al. Equation of State Calculations by Fast Computing Machines. *The Journal of Chemical Physics* 21, 1087-1092, (1953).
Hastings, W. K. Monte Carlo sampling methods using Markov chains and their applications. *Biometrika* 57, 97-109, (1970).
Sun, J., et al. Strongly Constrained and Appropriately Normed Semilocal Density Functional. *Physical Review Letters* 115, 036402, 1-6 (2015).
Kitchaev, D. A. et al. Energetics of $MnO_2$ polymorphs in density functional theory. *Physical Review B* 93, 045132, 1-5 (2016).
Zhang, Y. et al. Efficient first-principles prediction of solid stability: Towards chemical accuracy. *npj Computational Materials* 4, 9, 1-6 (2018).
International Search Report dated Nov. 4, 2020 in International Patent Application No. PCT/US2020/045765 (3 pages).
Written Opinion of the International Searching Authority dated Nov. 4, 2020 International Patent Application No. PCT/US2020/045765 (4 pages).
International Search Report dated Oct. 4, 2020 in International Patent Application No. PCT/US2020/045765 (3 pages).
Written Opinion of the International Searching Authority dated Oct. 4, 2020 International Patent Application No. PCT/US2020/045765 (5 pages).

* cited by examiner

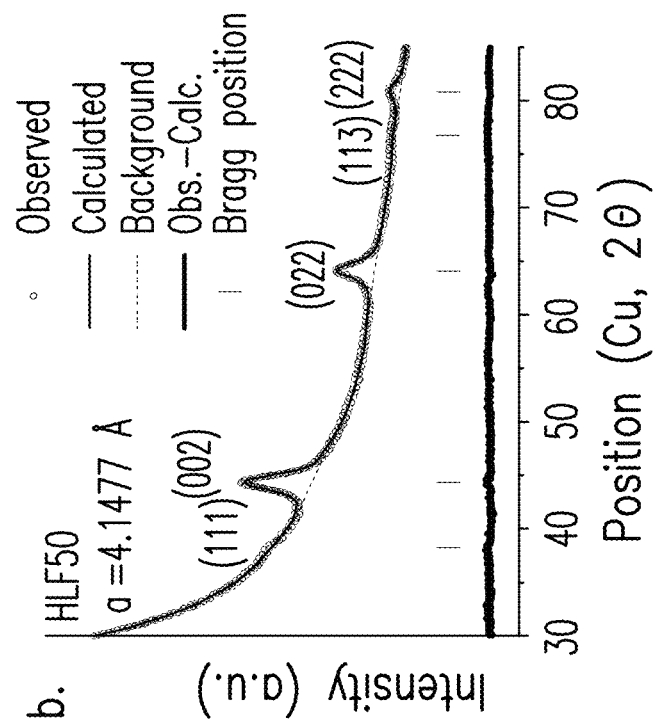
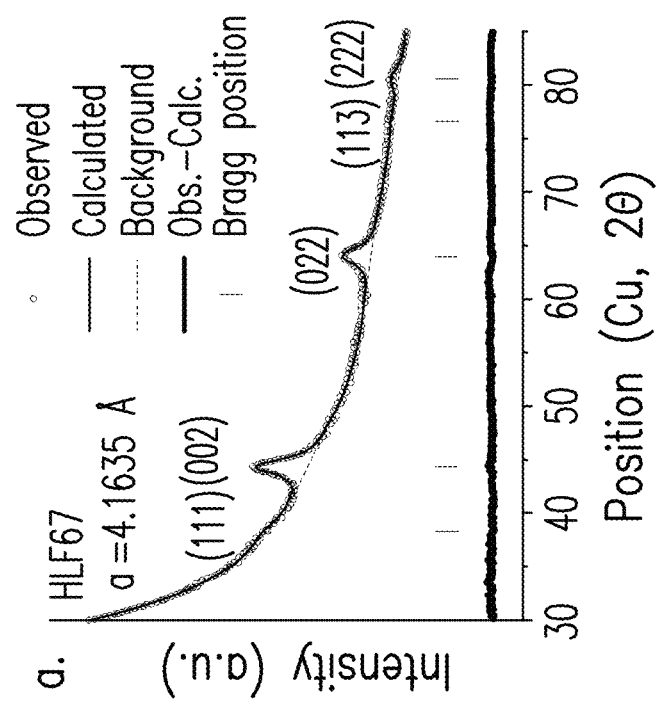
FIG. 1a
FIG. 1b a. HLF67 b. HLF50 c. HLF33 d. LLF67

CATION-DISORDERED ROCKSALT LITHIUM MANGANESE OXIDES OR OXYFLUORIDES

FIELD OF THE INVENTION

A class of compositions in the Li—Mn—O—F chemical space for Li-ion cathode materials. Such compositions are characterized by: (i) high capacities (e.g., >240 mAh/g); (ii) high energy densities (e.g., >750 Wh/kg between 1.5-4.8V); (iii) favorable cyclability; and (iv) low cost.

BACKGROUND OF THE INVENTION

Provided at the end of the following disclosure is a listing of references that are considered potentially informative as to background aspects of the relevant technology and the state of the art. Some of the listed references are cited in the disclosure itself. The entire contents of each listed reference are incorporated herein by reference.

The increasing demand for cheap, portable, high density energy storage for personal devices, transportation, and in the electrical grid has driven the development of advanced Li-ion battery systems[1-3]. State-of-the-art high energy density battery systems are currently based on layered oxides targeting high voltage redox activity on Co, Mn and Ni. However, use of Co leads to heightened costs, and while Co quantities may be lowered in favor of heighted Ni quantities, increased Ni presents its own cost issues as well as certain manufacturing complications.

Studies have been made into Mn-redox-based cation-disordered rocksalt (DRX) materials as potential alternatives to conventional battery assemblies, and these materials have been found to exhibit promising electrochemical performance. For example, $Li_4Mn_2O_5$, utilizing a combination of $Mn^{3+}/Mn^{4+}$, $O^{2-}/O^-$, and $Mn^{4+}/Mn^{5+}$ redox, has been found to provide a high initial capacity of 355 mAh $g^{-1}$; though with severe capacity fading upon extended cycling[4]. By combining fluorination with high-valent charge compensating cations, it is possible to accommodate Li-excess without significant reduction of the transition metal (TM) redox capacity. Partial fluorine substitution was applied on top of $Li_2MnO_3$ to form $Li_{1.9}Mn_{0.95}O_{2.05}F_{0.95}$, which yields improved cyclability[5]. In $Li_2Mn_{0.6667}Nb_{0.3333}O_2F/Li_2Mn_{0.5}Ti_{0.5}O_2F$, over 300 mAh $g^{-1}$ capacity and around 1000 Wh $kg^{-1}$ energy density is achieved mostly derived from $Mn^{2+}$ to $Mn^{4+}$ oxidation[6]. In another example, $V^{4+}$ was applied as a charge compensator in $Li_{1.171}Mn_{0.343}V_{0.486}O_{1.8}F_{0.2}$ to obtain additional electron capacity from the $V^{4+}/V^{5+}$ redox beyond that provided by the $Mn^{2+}/Mn^{4+}$ redox[7].

SUMMARY OF THE INVENTION

Presented herein are chemical compositions that depart from conventional Co and Ni battery assemblies by instead offering cobalt-free, high-capacity Li-ion battery cathode materials synthesized with Mn-based Li-excess cation-disordered rocksalt (DRX) oxide or oxyfluorides, particularly within the Li—Mn—O—F chemical space ($Li_xMn_{2-x}O_{2-y}$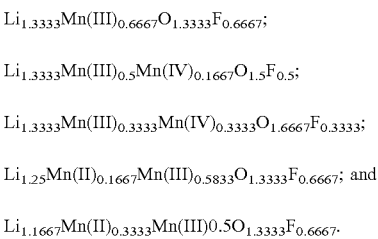$F_y$; $1.1 \leq x \leq 1.3333$; $0 \leq y \leq 0.6667$). Compositions of interest include, though are not limited to, preferred embodiments such as:

$Li_{1.3333}Mn(III)_{0.6667}O_{1.3333}F_{0.6667}$;

$Li_{1.3333}Mn(III)_{0.5}Mn(IV)_{0.1667}O_{1.5}F_{0.5}$;

$Li_{1.3333}Mn(III)_{0.3333}Mn(IV)_{0.3333}O_{1.6667}F_{0.3333}$;

$Li_{1.25}Mn(II)_{0.1667}Mn(III)_{0.5833}O_{1.3333}F_{0.6667}$; and $Li_{1.1667}Mn(II)_{0.3333}Mn(III)0.5O_{1.3333}F_{0.6667}$.

Compositions addressed herein have a cation-disordered rocksalt (DRX) structure that is adapted for facile Li migration through 0-TM channels. The compositions are adapted to utilize a combination of Mn redox and oxygen redox during charge and discharge phases, and display favorable average capacities and specific energies. For example, after 30 cycles in a range of 1.5-4.6 V, the compositions may exhibit an average capacity from 219 to 310 mAh $g^{-1}$, more preferably from 243 to 310 mAh $g^{-1}$; with a specific energy from 686 to 963 Wh $kg^{-1}$, more preferably 770 to 963 Wh $kg^{-1}$. In other examples, after 30 cycles in a range of 1.5-4.8 V, the compositions may exhibit an average capacity from 242 to 336 mAh $g^{-1}$, more preferably from 284 to 336 mAh $g^{-1}$; with a specific energy from 771 to 1059 Wh $kg^{-1}$, more preferably 909 to 1059 Wh $kg^{-1}$. In yet further examples, after 30 cycles in a range of 1.5-5.0 V, the compositions may exhibit an average capacity from 256 to 349 mAh $g^{-1}$, more preferably from 319 to 349 mAh $g^{-1}$; with a specific energy from 822 to 1068 Wh $kg^{-1}$, more preferably 1016 to 1068 Wh $kg^{-1}$.

The present invention also addresses electrode materials formed, at least in part, with a composition in the defined Li—Mn—O—F chemical space. The electrode material may be any of an electrolyte; an anode; and a cathode. The electrode material may further include a conductive additive (e.g., SUPER C65), and polytetrafluoroethylene (PTFE) at a weight ratio of, for example, 70:20:10, respectively. The present invention further addresses Li-ion batteries that include an electrode material formed, at least in part, with a composition in the defined Li—Mn—O—F chemical space; as well as portable electronic devices, automobiles, or energy storage systems that include such a Li-ion battery.

Further addressed herein are methods of synthesizing a composition in the defined Li—Mn—O—F chemical space, including steps of combining a collection of stoichiometric compounds composed of Li, Mn, O, and F to yield a precursor powder and mechanically mixing the precursor powder to obtain the phase pure powder through mechanochemical alloying. The stoichiometric compounds may include stoichiometric $Li_2O$, MnO, $Mn_2O_3$, $MnO_2$, and LiF. The precursor powder is subjected to mechanical mixing by dispensing the precursor powder into a planetary ball mill, and grinding the precursor powders for 40 to 55 hours, and in some examples 40 to 50 hours at a rate of 500 rpm.

Materials according to the present invention are suitable for use as cathode, anode, and electrolyte materials in rechargeable lithium batteries. Though the discussion below may present examples relative to specific constructions (e.g., examples of cathodes), it will be understood that such examples are non-limiting, and that the invention is equally applicable to other uses (e.g., anodes; electrolytes; etc.).

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIGS. 1a-1e shows detailed XRD patterns for compositions according to the present invention;

DETAILED DESCRIPTION OF THE INVENTION

Figure 1C:
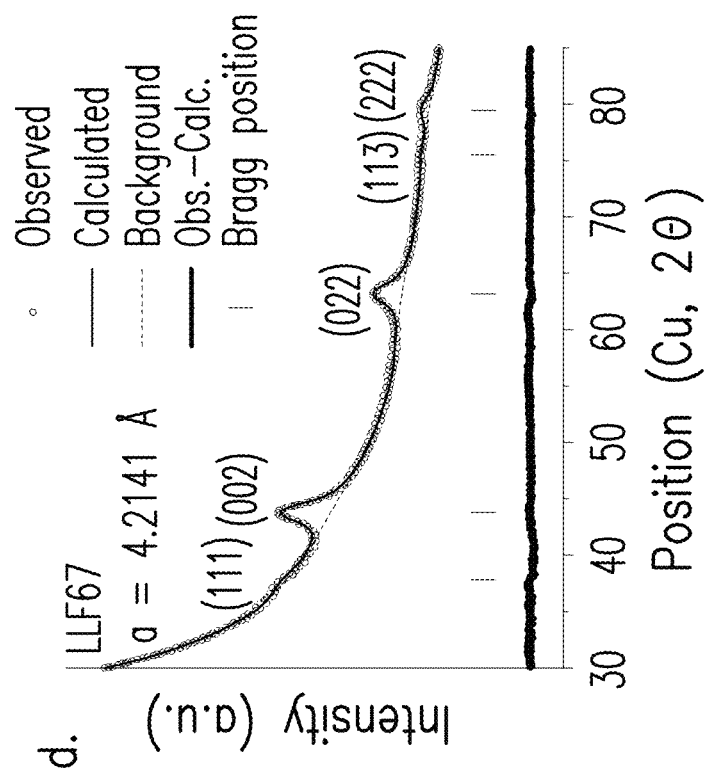
Figure 1D:
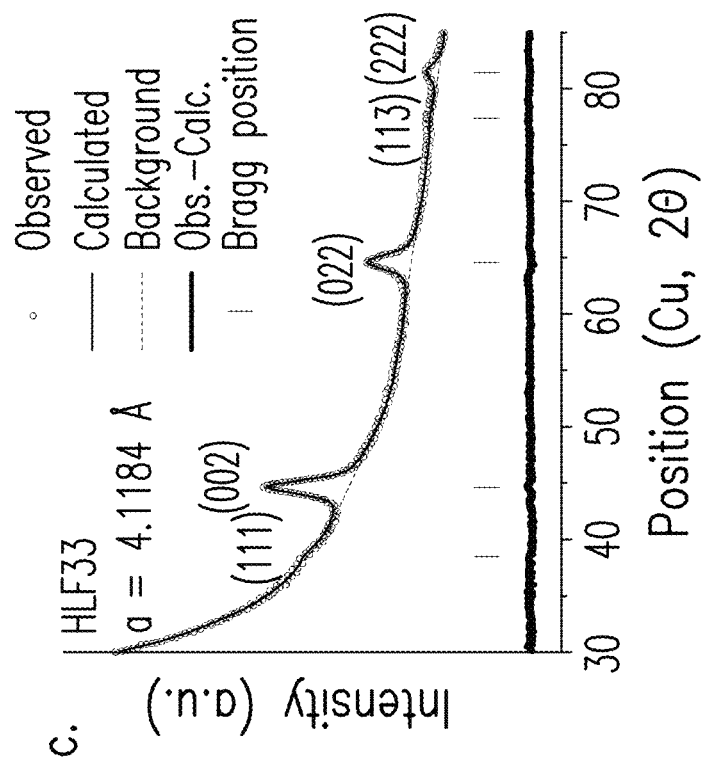
Figure 1E:
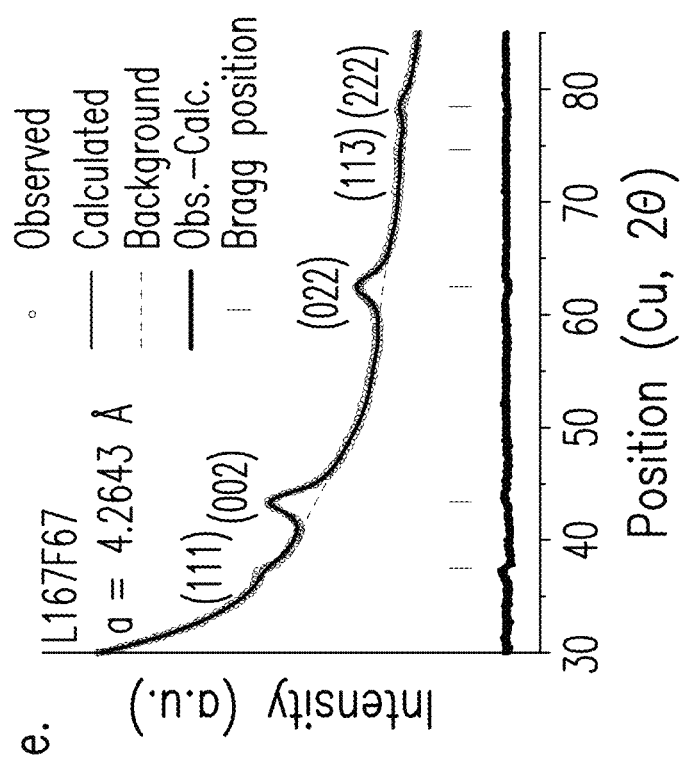

The following disclosure discusses the present invention with reference to the examples shown in the accompanying drawings, though does not limit the invention to those examples.

Discussed herein are cobalt-free, high-capacity Li-ion battery cathode materials synthesized as Mn-based Li-excess cation-disordered rocksalt (DRX) oxides or oxyfluorides. Compositions according to the present invention allow for the construction of cathodes that forego the conventional layered structure[5, 7-16], and enables F-to-O substitution, which may provide additional metal-redox capacity and improved cyclability[7, 11, 14].

Li transport in DRX materials relies mainly on tetrahedral intermediate sites with no face sharing TMs, i.e., the so-called "0-TM" channels (percolation network). In the following, Li connected to a percolation network are referred to as "percolating Li", the number of which is an important indicator of the Li transport properties in DRX materials. Mn-based Li-excess DRX oxides or oxyfluorides according to the present invention offer promising opportunities for next-generation rechargeable battery cathodes owing to their large energy densities and favorable cyclabilities. The Li—Mn—O—F chemical space is especially interesting for two main reasons: it only contains Mn, which is an earth-abundant element with good redox activity (both the $Mn^{3+}/Mn^{4+}$ and $Mn^{2+}/Mn^{4+}$ redox); and the oxygen redox is facile, without severe oxygen loss or structural degradation, as evidenced by differential electrochemical mass spectroscopy (DEMS) measurements[5-7, 11].

Also, though lacking long-range order (LRO), DRX materials have different types of short-range order (SRO) that can significantly affect their performance[15-17]. Thus, for example, despite their chemical similarity, $Li_{1.2}Mn_{0.4}Ti_{0.402}$ and $Li_{1.2}Mn_{0.4}Zr_{0.4}O_2$ have been found to exhibit greatly different electrochemical performance owing to their different local cation arrangements (i.e., SRO) and thus distinct 0-TM percolation networks[15]. In addition, in DRX oxides or oxyfluorides, it is seen that the presence of F creates more Li-rich local environments because of the strong preference for Li—F bonds over TM-F bonds[16]. These two types of SRO play important roles in determining the electrochemical performance of the DRX materials as they modify the 0-TM percolation networks.

The following discussion addresses compositions in the Li—Mn—O—F ($Li_xMn_{2-x}O_{2-y}F_y$) DRX chemical space, ($1.1 \leq x \leq 1.333$) and ($0 \leq y \leq 0.6667$), such as:

$Li_{1.3333}Mn(III)_{0.6667}O_{1.3333}F_{0.6667}$, hereafter HLF67;

$Li_{1.3333}Mn(III)_{0.5}Mn(IV)_{0.1667}O_{1.5}F_{0.5}$, hereafter HLF50;

$Li_{1.3333}Mn(III)_{0.3333}Mn(IV)_{0.3333}O_{1.6667}F_{0.3333}$, hereafter HLF33;

$Li_{1.25}Mn(II)_{0.1667}Mn(III)_{0.5833}O_{1.3333}F_{0.6667}$, hereafter LLF67; and $Li_{1.1667}Mn(II)_{0.3333}Mn(III)_{0.5}O_{1.3333}F_{0.6667}$, hereafter L167F67.

Of the foregoing exemplary compositions, HLF67, HLF50, HLF33 and LLF67 demonstrate promising attributes for cathode constructions, and L167F67 is further illustrative of design principles in the targeted chemical space. Discussion is also presented herein relative to the composition $Li_2MnO_3$ as a further demonstration of design principles. Elemental analysis, as shown in the following Table S1, confirms the studied compositions are within the target bounds.

TABLE S1

| Materials | Target atomic ratio (Li:Mn:F) | Measured ratio (Li:Mn:F) |
|---|---|---|
| HLF67 | 1.333:0.667:0.667 | 1.323:0.671:0.66 |
| HLF50 | 1.333:0.667:0.5 | 1.313:0.662:0.512 |
| HLF33 | 1.333:0.667:0.333 | 1.296:0.65:0.35 |

TABLE S1-continued

| Materials | Target atomic ratio (Li:Mn:F) | Measured ratio (Li:Mn:F) |
|---|---|---|
| LLF67 | 1.25:0.75:0.667 | 1.25:0.742:0.678 |
| L167F67 | 1.167:0.833:0.667 | 1.179:0.83:0.659 |

Among the synthesized compositions, a first comparison is found between HLF67, HLF50 and HLF33, in which the Li content remains the same while the F content gradually decreases from HLF67 to HLF33, such that less TM redox capacity is expected as more $Mn^{4+}$ is present to keep charge balance. A second comparison is found between HLF67 and LLF67, in which the F content remains the same, with different Li contents. Notably, $Mn^{2+}$ is incorporated in LLF67 to maintain charge balance, so it has more TM redox capacity despite less theoretical Li capacity. The further reduced Li contents of L167F67 provides a yet further comparison with HLF67 and LLF67. As seen in the individual examples, each of the synthesized compounds shows an outstanding capacity (>240 mAh $g^{-1}$) and energy density (>750 Wh $kg^{-1}$), with favorable cyclability.

Though the following discussion addresses particular synthesized compositions, it will be understood that those are non-limiting examples and that the invention is inclusive of other compositions within the defined Li—Mn—O—F chemical space ($Li_xMn_{2-x}O_{2-y}F_y$; 1.1≤x≤1.3333; 0≤y≤0.6667), which will be shown in the end in a predicted capacity map. It will be further understood that Mn may be present in a single oxidation state, or a combination of multiple oxidation states.

The inclusion of DRX systems offers a flexibility in cathode composition and redox behavior, without sacrificing rate capability, if at least 55% of the cation sublattice is occupied by $Li^{[8, 18]}$. Without being bound by theory, it is considered that the Li transport networks determine the initial capacity of the compounds, whereas the metal-redox capacity controls the capacity retention.

Each tested Li—Mn—O—F compound was synthesized by mechanochemical ball-milling, with $Li_2O$ (Alfa Aesar, ACS, 99% min), MnO (Sigma-Aldrich, 99.99%), $Mn_2O_3$ (Alfa Aesar, 99%), $MnO_2$ (Alfa Aesar, 99.9%), and LiF (Alfa Aesar, 99.99%) used as precursors. The precursors were stoichiometrically mixed according to charge-balance with a Retsch PM 200 Planetary Ball Mill at a rate of 300 rpm for 2 hours. The mixed precursors were then ball-milled at 500 rpm in Argon-filled stainless-steel ball-mill jars, using a Retsch PM 200 Planetary Ball Mill. The duration of ball-mill synthesis for HLF67, HLF50, HLF33 was 40 hours, for LLF67 was 50 hours, and for L167F167 was 55 hours.

Cathode films were then formed from the active materials, conductive carbon black (SUPER C65, Timcal), and polytetrafluoroethylene (PTFE, DuPont, Teflon 8A) at a weight ratio of 70:20:10, respectively. The cathode films were made by mixing and shaker-milling 280 mg active materials and 80 mg SUPER C65 for 1 hour in argon atmosphere with SPEX 800M Mixer/Mill, with PTFE thereafter added to the shaker-milled mixture and further manually mixed for 40 minutes. The components were then rolled into thin films inside a glovebox. Commercialized 1M $LiPF_6$ in ethylene carbonate (EC) and dimethyl carbonate (DMC) solution (volume ratio 1:1) were used as electrolyte. Glass microfibers (Whatman®, GE Healthcare) were used as a separator, and Li metal foil (FMC Corp.) was used for anodes. Coin cells were assembled inside the glovebox and tested on an Arbin battery cell testing instrument at room temperature. The loading density of the cathode films was around 3 mg $cm^{-2}$ based on active materials, and the specific capacities were calculated based on the weight of active materials (70%) in the cathode films.

X-ray diffraction (XRD) patterns for the synthesized compounds were collected on a Rigaku MiniFlex diffractometer (Cu source) in the 2θ range of 5-85°. Rietveld refinement was done with PANalytical X'pert HighScore Plus software. Elemental analysis was performed with direct current plasma emission spectroscopy (ASTM E 1079-12) for lithium, manganese, niobium, and with an ion selective electrode (ASTM D 1179-10) for fluorine. Scanning electron microscopy (SEM) images were collected using a Zeiss Gemini Ultra-55 Analytical Field Emission SEM, and scanning transmission electron microscopy (STEM)/energy dispersive spectroscopy (EDS) measurements were performed on a JEM-2010F microscope equipped with an X-mas EDS detector.

The X-ray absorption near edge spectroscopy (XANES) of Mn K-edge was acquired in transmission mode at beamline 20-BM-B in Advanced Photon Source. The incident beam energy was selected using a Si (111) monochromator. The energy calibration was performed by simultaneously measuring the spectra of appropriate metal foil. Harmonic rejection was accomplished using an Rh-coated mirror. All the ex-situ samples are electrode films, composed of active materials, SUPER C65 and PTFE with weight ratio of 70:20:10, respectively, and loading density of 5 mg $cm^{-2}$ (based on active materials). The electrodes were assembled as coin cells, charged to designated capacities, then disassembled and washed with DMC in a glovebox (except for pristine materials). Additional spectra of reference standards were also measured to facilitate the interpretation. The raw data was normalized and calibrated using Athena software.

Combination of density functional theory (DFT) calculations together with cluster expansion Monte Carlo (MC) simulations[7, 19] were applied to understand the energetics, SRO and Li percolation in the $LiF-MnO-LiMnO_2-Li_2MnO_3$ compositional space. With the DFT calculations on sampled structures, the cluster expansion consisting of pair interactions up to 7.1 Å, triplet interactions up to 4.0 Å, and quadruplet interactions up to 4.0 Å based on a primitive rocksalt lattice were calculated. The effective cluster interactions and dielectric constant were obtained from a L1-regularized least squares regression[20], with the regularization parameters chosen to minimize cross-validation error[20]. By this procedure, a root-mean-squared error below 7 meV/atom was obtained.

The DFT calculations were performed with the Vienna ab-initio simulation package (VASP)[21] and the projector-augmented wave (PAW) method[22]. For each structural optimization calculation, a reciprocal space discretization of 25 Å was applied, and convergence criteria was set as $10^{-6}$ eV for electronic loops and 0.02 eV/Å for ionic loops. The PBE exchange-correlation functional with the rotationally-averaged Hubbard U correction[23] was applied for obtaining more accurate DFT energetics, the U parameters were chosen from a previously reported calibration to oxide formation energies[24] (3.9 eV for Mn).

For short range ordering analysis and percolation evaluation, canonical MC sampling of full lithiated structure using the MetropolisHastings algorithm[25, 26] was performed on different compositions and temperatures on basis of the cluster expansion parameterization. To achieve strong statistics, for each analysis at certain composition and temperature, 500 structures, each consisting of 6×6×8 supercells, with 576 atoms, were sampled.

To evaluate the voltage curve and redox mechanism theoretically, all possible Li-Vacancy ordering in small supercells were enumerated with energies calculated by SCAN meta-GGA exchange correlation functional[27] due to more accurate ranking of structure energetics[28, 29]. With energetics evaluated by SCAN, the delithiated cluster expansion was then fitted as an offset from a baseline of formal charge electrostatics. The various oxidation states of Mn and O were treated as different species and identified according to their magnetic moment from SCAN calculations. The final root-mean-square error of this cluster expansion was less than 5 meV/atom. With the established delithiated cluster expansion, the most stable Li-Vacancy ordering at each delithiation stage was fully relaxed for constructing the voltage curve. The pymatgen code was utilized for all the structure analysis and post-processing.

Figure 2A:
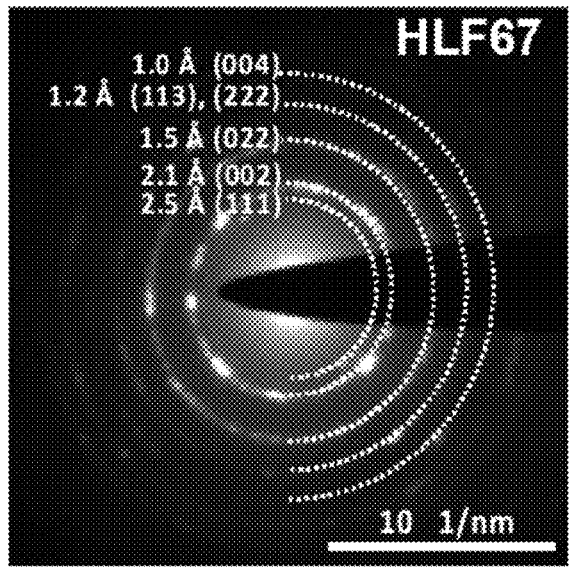
FIGS. 2a-2c show transmission electron microscopy (TEM) electron diffraction (ED) patterns of for compositions according to the present invention.
Figure 2B:
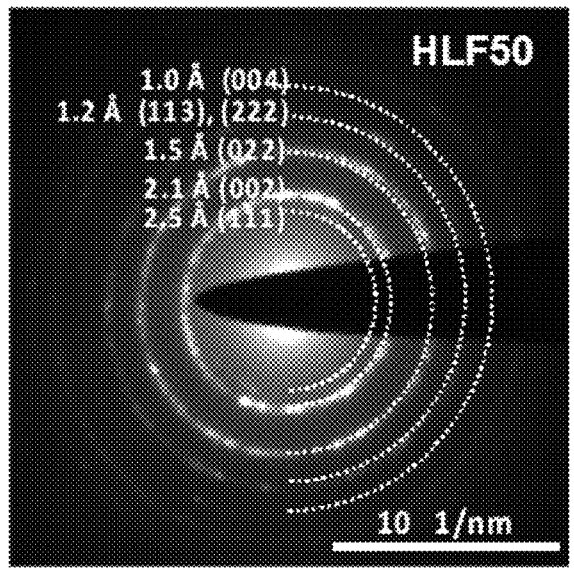
Figure 2C:
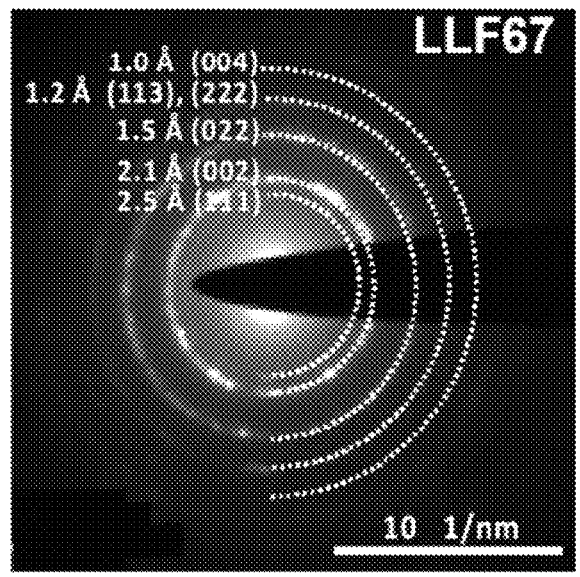
Figure 3A:
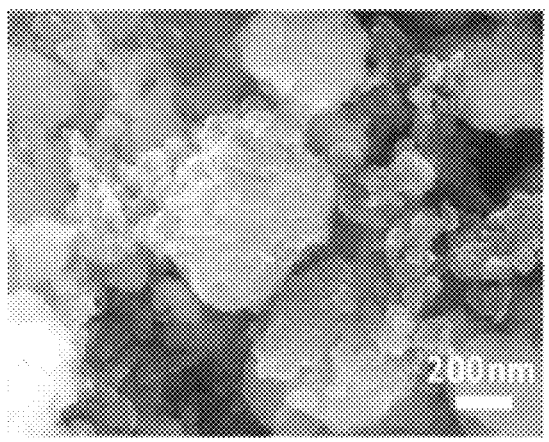
FIGS. 3a-3d show scanning electron microscopy (SEM) images of compositions according to the present invention.
Figure 3B:
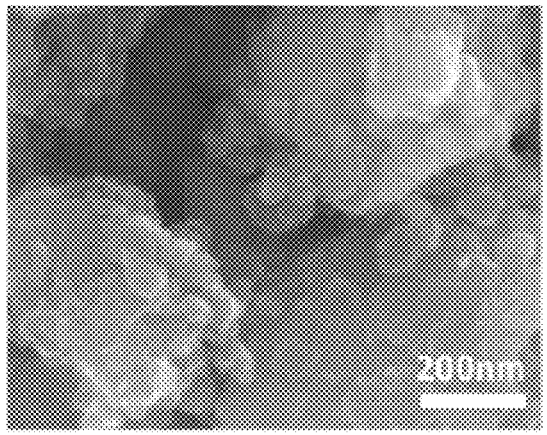
Figure 3C:
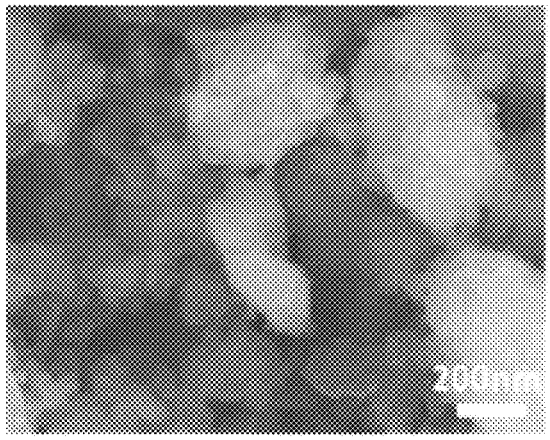
Figure 3D:
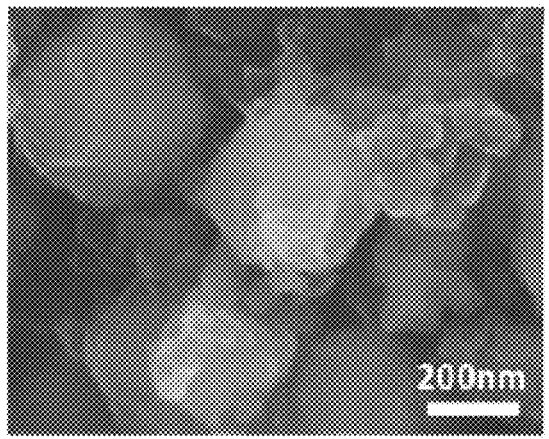

The XRD patterns and refined lattice constants shown in FIGS. 1a-1e confirm that each of the synthesized compounds HLF67, HLF50, HLF33 and LLF67 forms a DRX structure with no observable impurity peaks. As seen in this figure, the presence of more $Mn^{4+}$ (as in HLF67 and HLF33) reduces the lattice constant from 4.1635 Å (HLF67) to 4.1477 Å (HLF50) and 4.1184 Å (HLF33). Meanwhile, the introduction of large $Mn^{2+}$ ions in LLF67 increases its lattice constant to 4.2141 Å, with an increase in $Mn^{2+}$ ions in L167F67 further increasing the lattice constant to 4.2643 Å. Transmission electron microscopy (TEM) electron diffraction (ED) patterns of HLF67, HLF50, and LLF67, as presented in FIGS. 2a-2c, also shows the phase-pure DRX structure without any observable impurities. Using scanning electron microscopy (SEM), as shown in FIGS. 3a-3d, primary particle size of the synthesized samples for HLF67, HLF50, HLF33, and LLF67 was estimated to be between 100 and 200 nm.

Figures 4A, 4B, 4C:
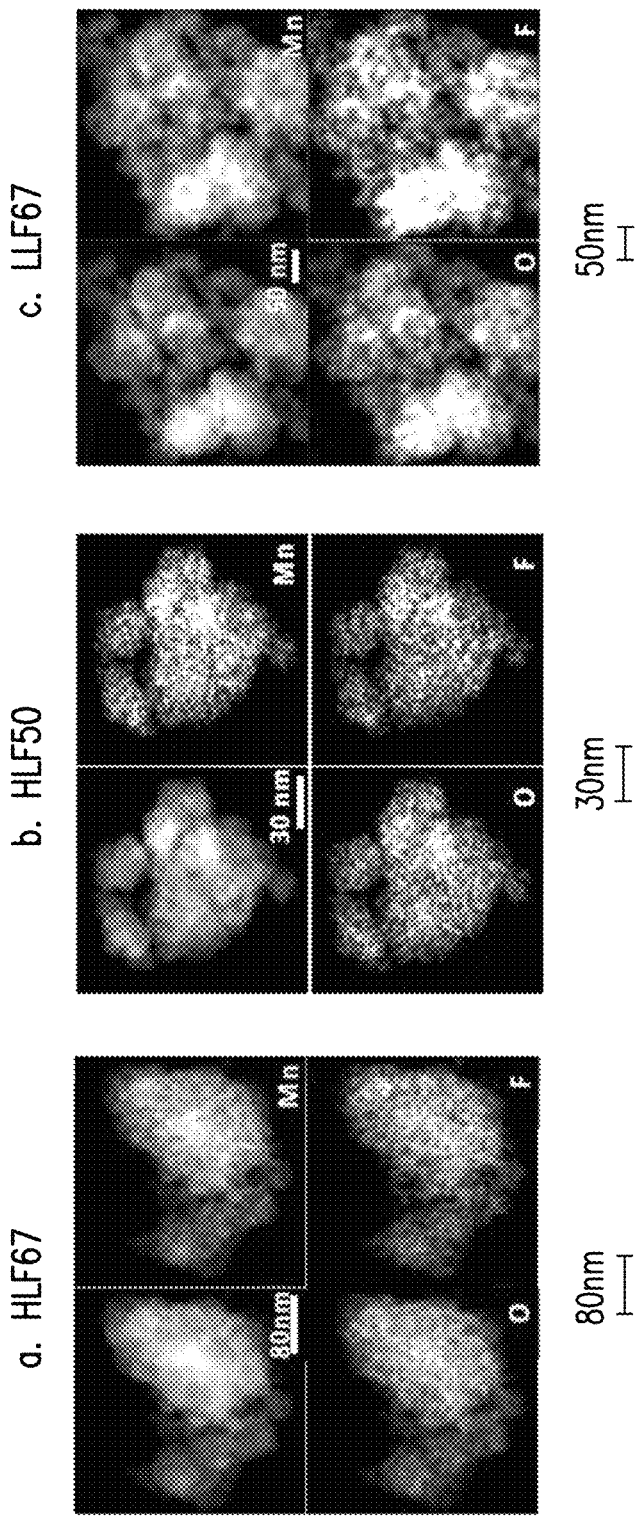
FIGS. 4a-4c show TEM energy dispersive spectroscopy (EDS) mapping of the elemental distribution in a particle cluster of compositions according to the present invention.
Figure 5B:
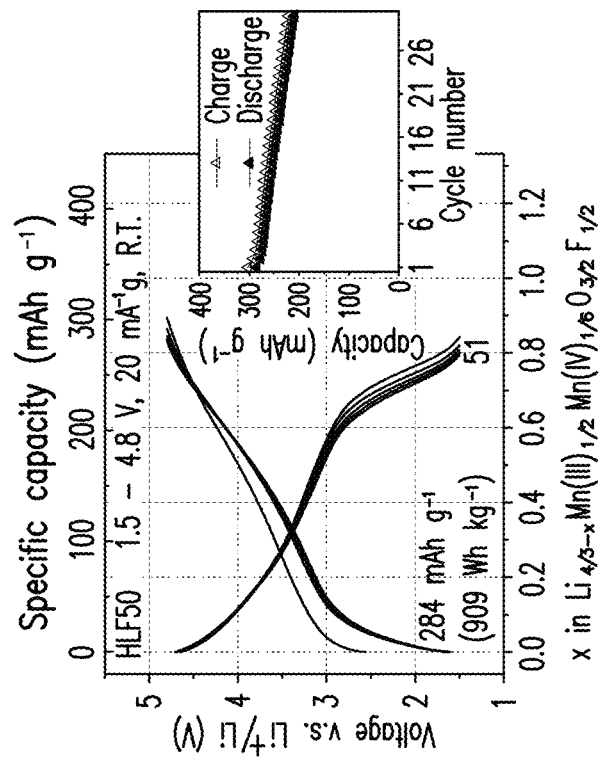
FIGS. 5a-5d show voltage profiles of compositions according to the present invention, each in a cycling range of 1.5 4.8 V.
Figure 5A:
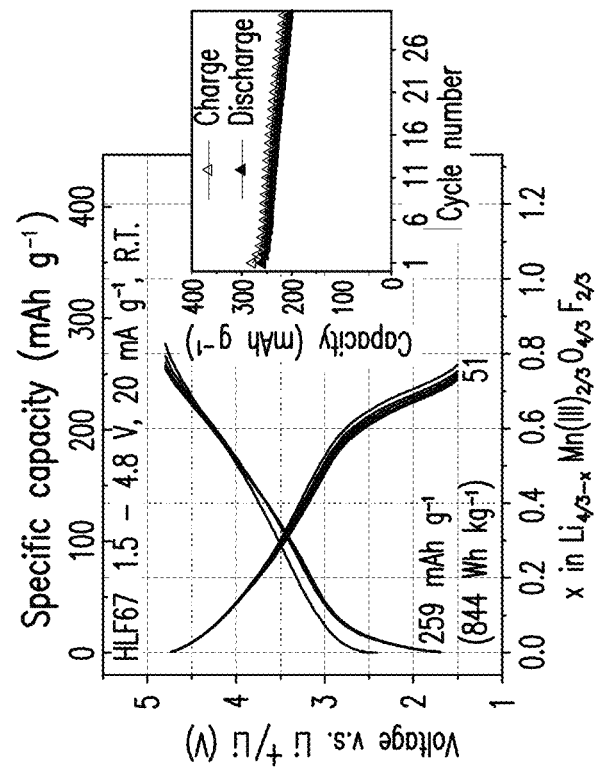
Figure 5D:
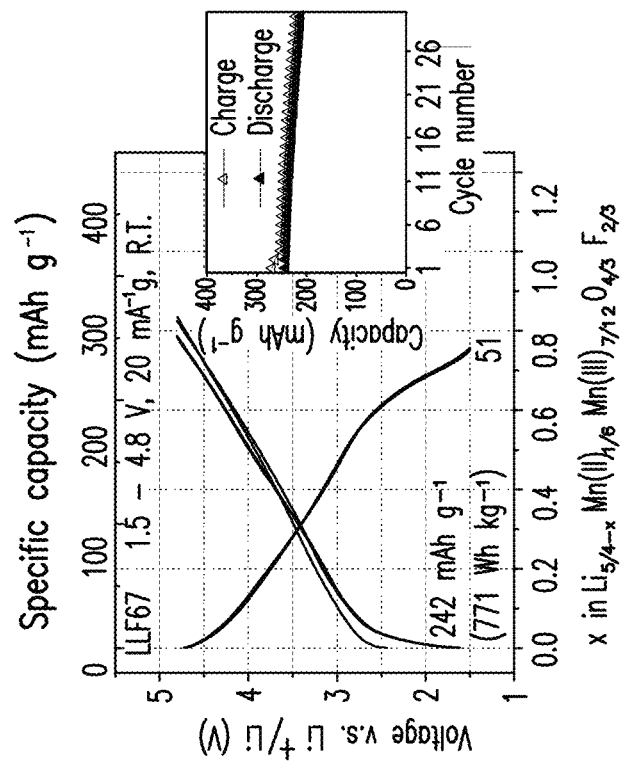
Figure 5C:
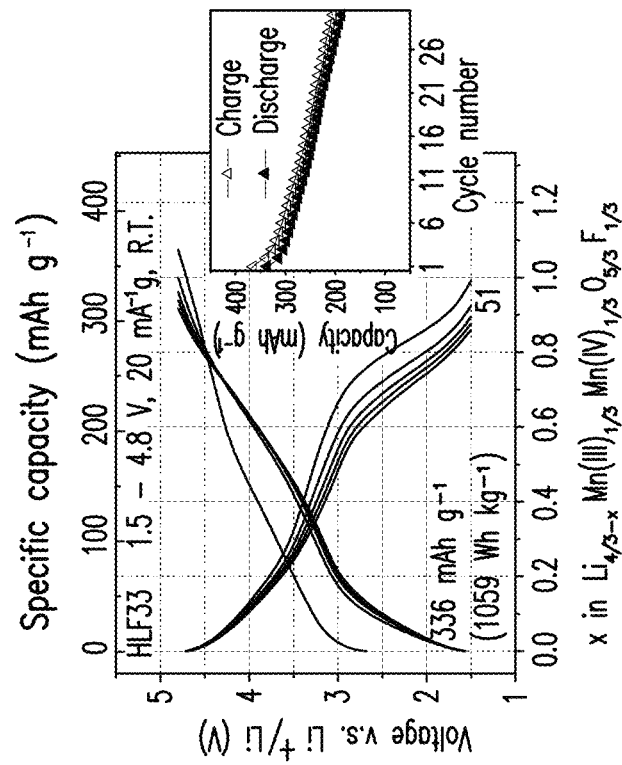
Figures 6A, 6B:
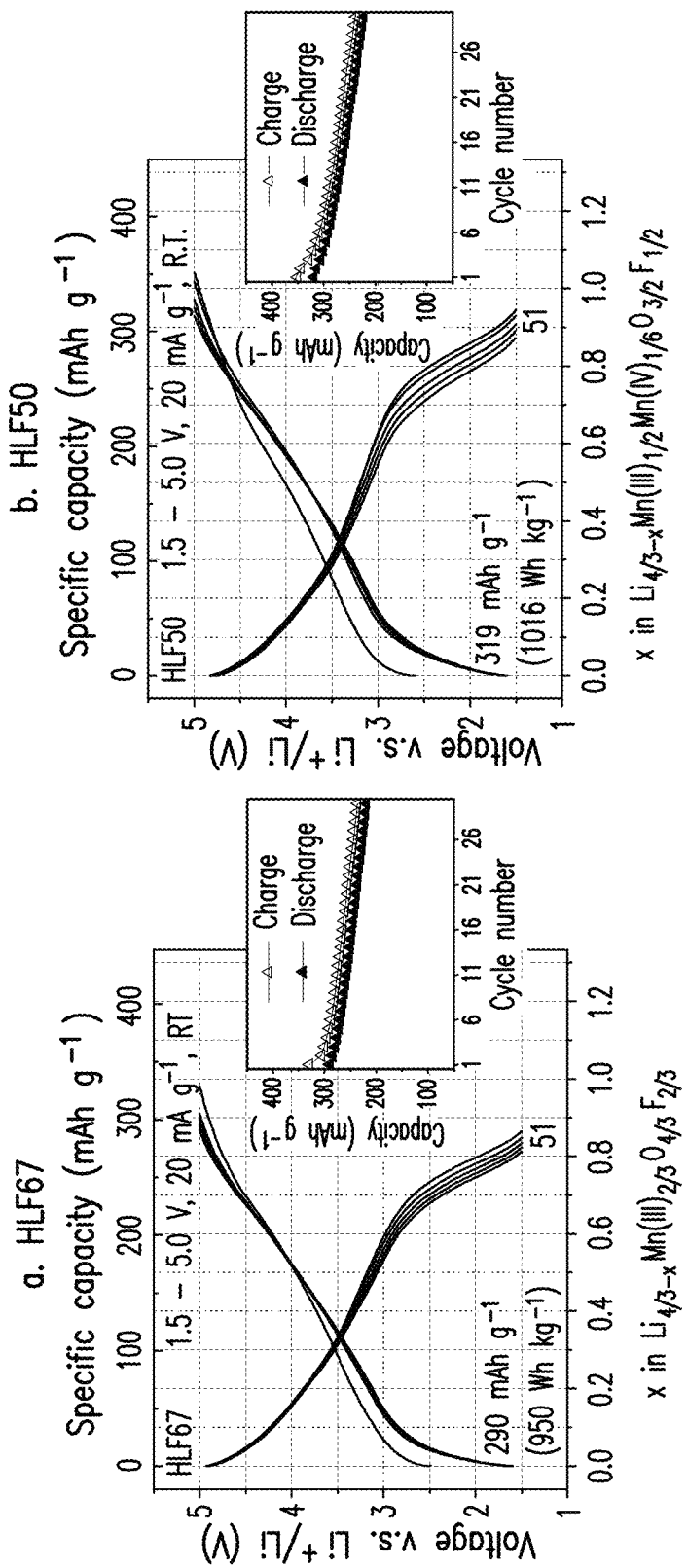
FIGS. 6a-6d show voltage profiles of compositions according to the present invention, each in a cycling range of 1.5-5.0 V.
Figures 6C, 6D:
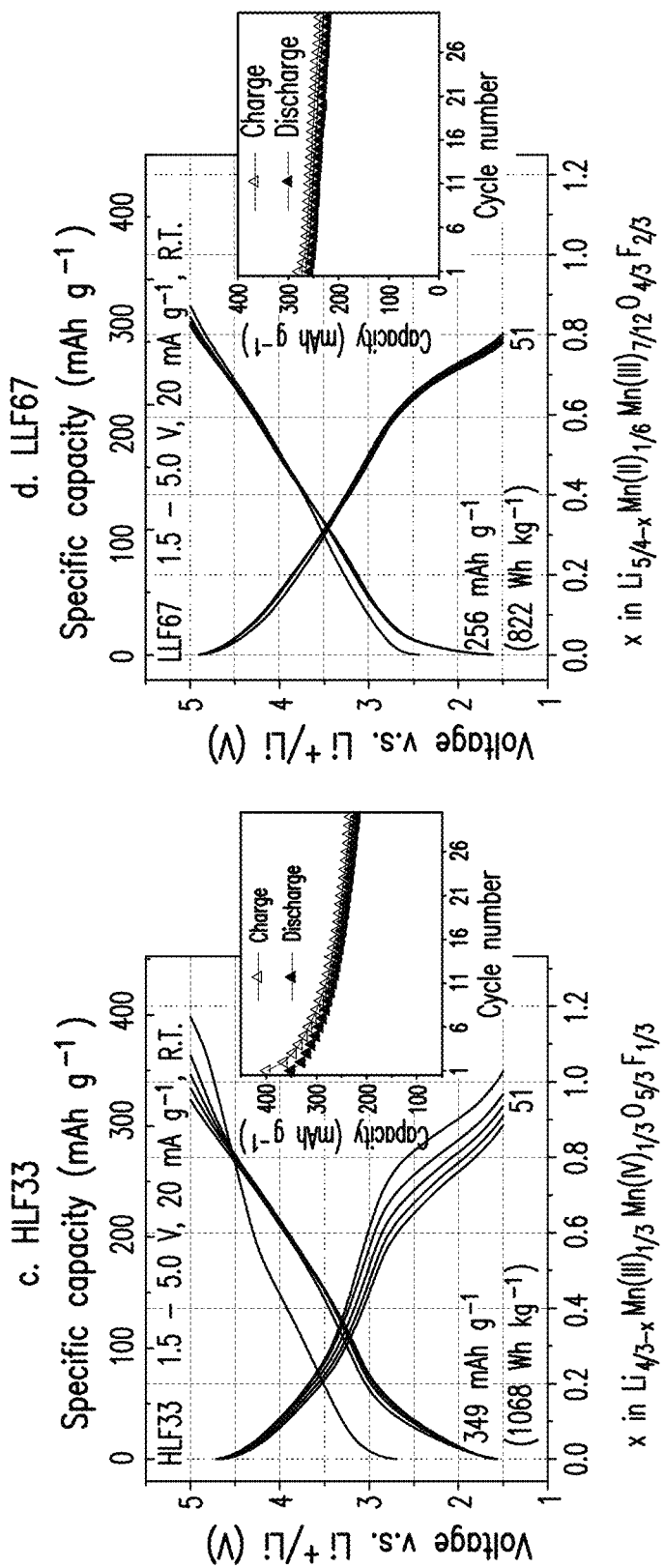

The successful bulk substitution of the fluorine of the as-synthesized materials, with the fluorine homogeneously distributed throughout the particles, was confirmed by TEM EDS mapping of the elemental distribution in a particle cluster of the representative sample, as shown in FIGS. 4a-4c, demonstrating that F was homogeneously distributed throughout the particles.

The electrochemical performance of the synthesized Li—Mn—O—F compounds was tested in galvanostatic mode at 20 mA $g^{-1}$ and room temperature within voltage windows of 1.5-4.8V and 1.5-5.0V. FIGS. 5a-5d show voltage profiles for synthesized compounds HLF67, HLF50, HLF33, and LLF67, as cycled between 1.5-4.8V. The insert in each profile shows the capacity retention of the corresponding compound over the first 30 cycles. As seen from the respective profiles, each of the synthesized compounds exhibited an average capacity of greater than 240 mAh/g and a specific energy density of greater than 750 Wh/kg—with HLF67 yielding 259 mAh $g^{-1}$ (844 Wh $kg^{-1}$); HLF50 yielding 284 mAh $g^{-1}$ (909 Wh $kg^{-1}$); HLF33 yielding 336 mAh $g^{-1}$ (1059 Wh $kg^{-1}$); and LLF67 yielding at 242 mAh $g^{-1}$ (771 Wh $kg^{-1}$). As seen from the respective inserts in each profile, the synthesized compounds were observed to yield favorable cyclability, with the synthesized compounds of HLF67, HLF50, HLF33, and LLF67, after 30 cycles, retaining 78.7%, 73.4%, 55.7%, and 87.5% of their initial capacities, respectively.

As a further comparison, FIGS. 6a-6d show voltage profiles for the synthesized compounds HLF67, HLF50, HLF33, and LLF67, as cycled between 1.5-5.0V. The insert in each profile again showing the capacity retention of the corresponding compound over the first 30 cycles. As seen in FIGS. 6a-6d, the synthesized compounds exhibited average capacity (specific energy density) values of 290 mAh $g^{-1}$ (950 Wh $kg^{-1}$) for HLF67; 319 mAh $g^{-1}$ (1016 Wh $kg^{-1}$) for HLF50; 349 mAh $g^{-1}$ (1068 Wh $kg^{-1}$) for HLF33; and 256 mAh $g^{-1}$ (822 Wh $kg^{-1}$) for LLF67. LLF67 in particular was found to have less than 15% capacity fading within the first 30 cycles.

Figure 7A:
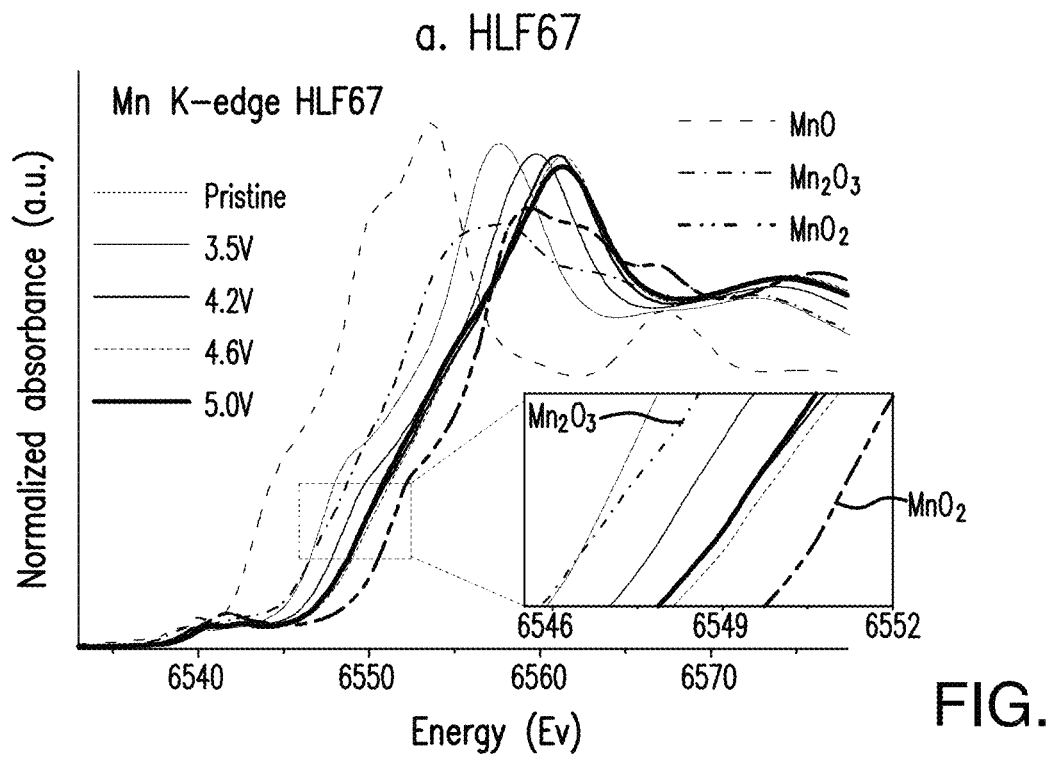
FIGS. 7a-7d further show redox mechanism compositions according to the present invention, as compared at several different charge states.
Figure 7B:
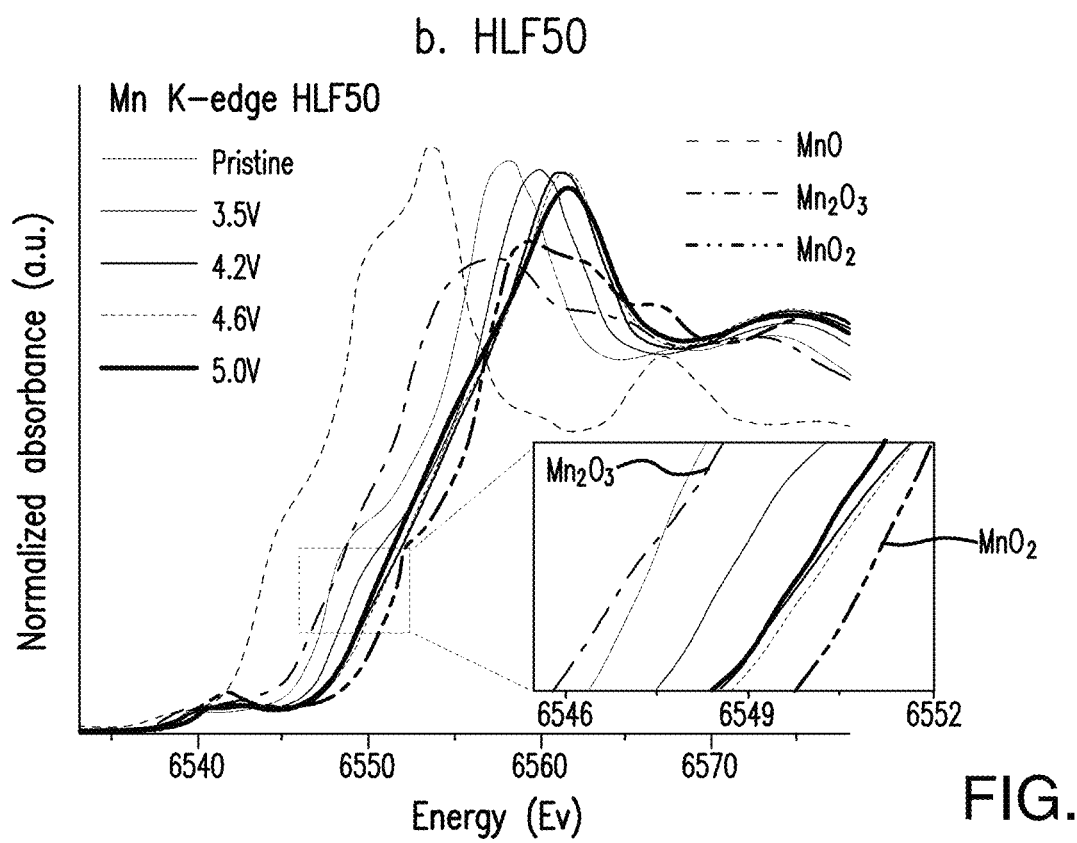
Figure 7C:
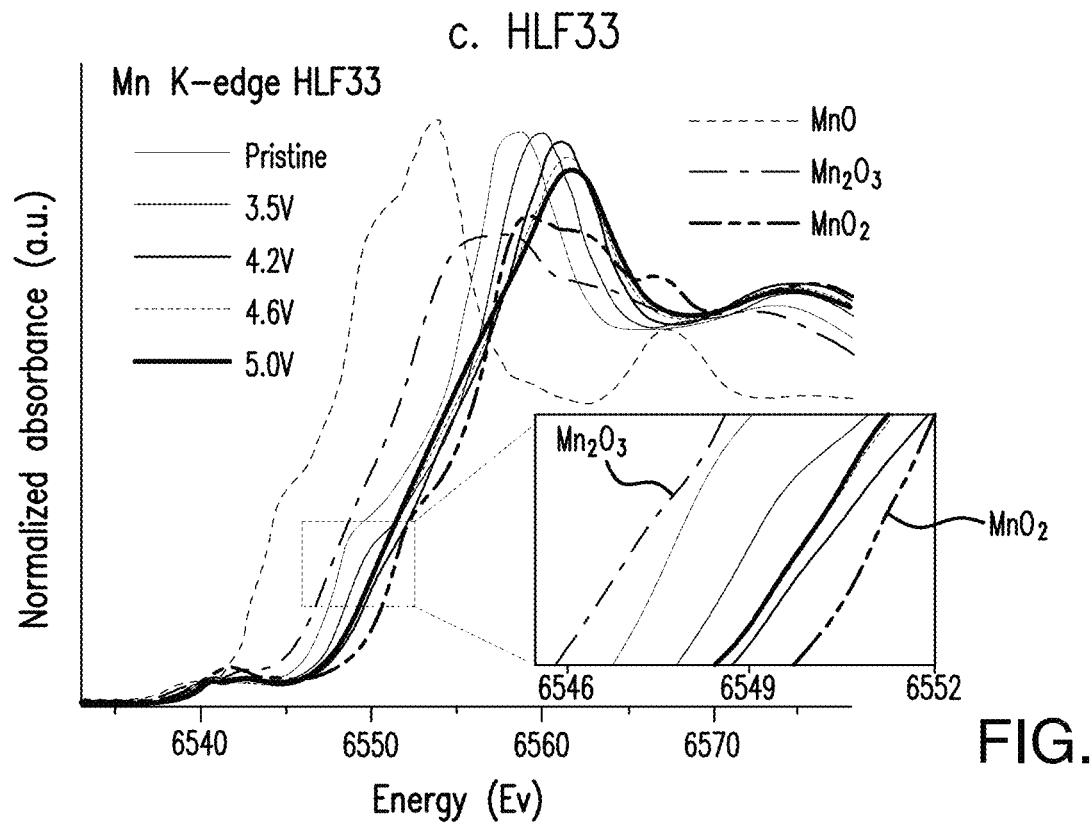
Figure 7D:
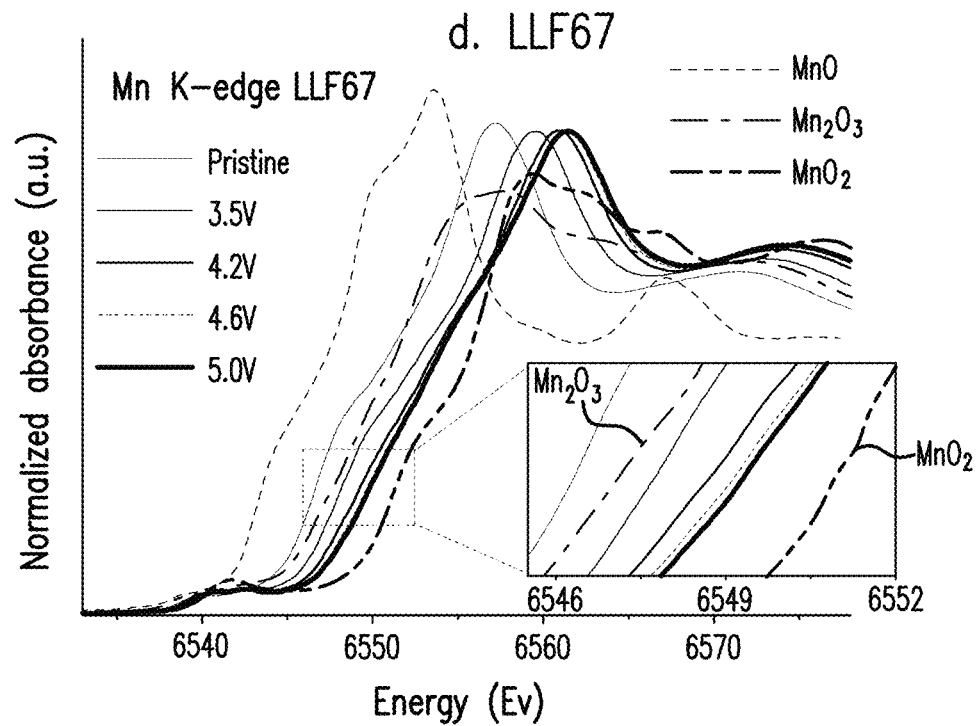

The redox mechanism of the Li—Mn—O—F compounds was investigated by ex-situ hard X-ray absorption spectroscopy (XAS). The oxidation behavior of Mn in HLF67 and LLF67 were compared by studying the two compositions at five different charge states, including: a pristine state; and four charged states of 3.5 V, 4.2 V, 4.6V, and 5.0 V, as shown in FIGS. 7a-7d. In general, similar redox behavior was observed for both compounds—particularly, Mn oxidation dominating at low voltage, while at high voltage the Mn K-edge barely shifts, indicating limited Mn redox. However, a small shift of the edge position to a lower energy at high voltage is observed in HLF67 but not in LLF67; this shift is believed to originate from the partial reduction of the transition metal (Mn in this case) due to oxygen redox. The partial reduction of Mn is also observed in HLF50 and HLF33, as shown in FIGS. 7b and 7c. This suggests more oxygen redox is involved in HLF67, HLF50 and HLF33 than in LLF67.

Figure 8:
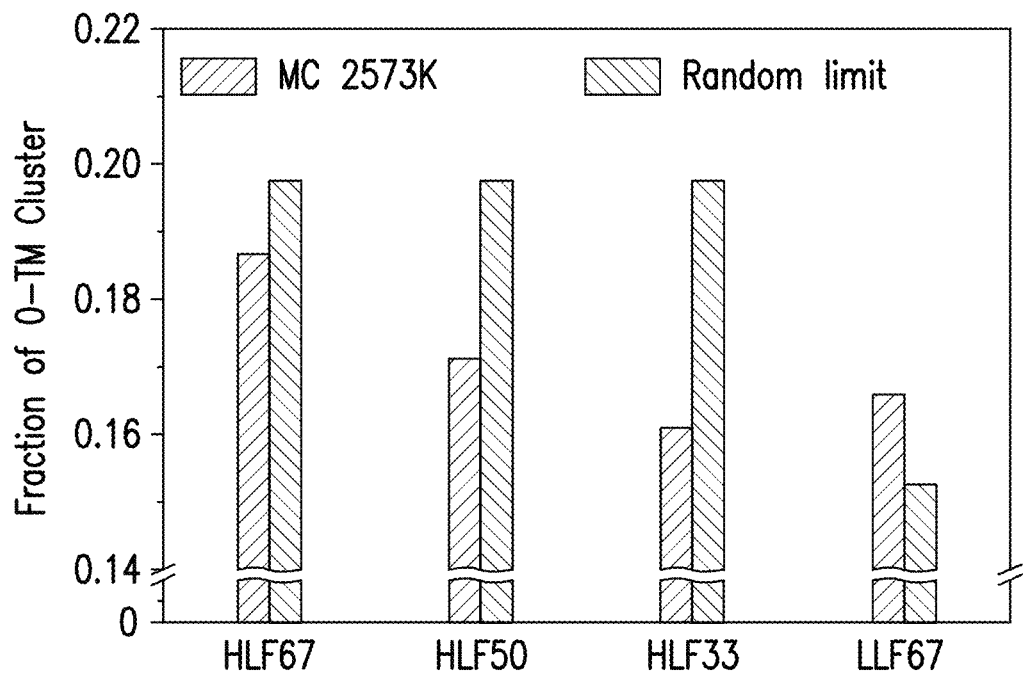
FIG. 8 shows the fraction of 0-TM cation clusters in compositions according to the present invention.
Figure 9:
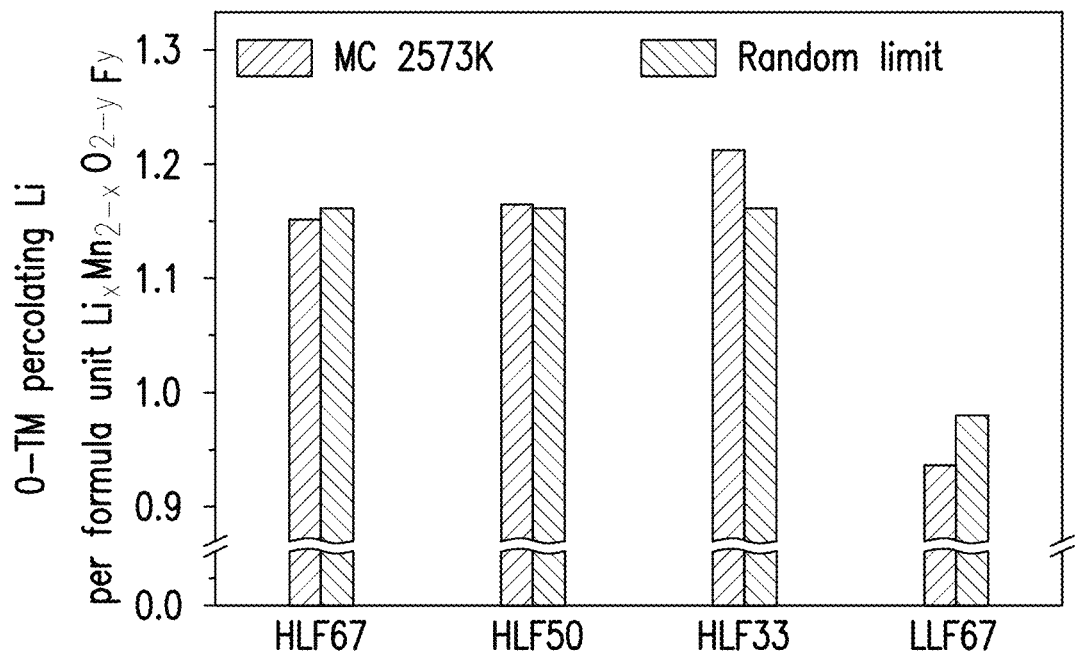
FIG. 9 shows the amount of 0-TM-connected Li (percolating Li) in compositions according to the present invention, as compared with random limits in Li—Mn—O—F compounds.

The occurrence of 0-TM tetrahedron was evaluated in the synthesized compounds to assess the effect of the Li network on the electrochemical performance of DRX compounds. FIG. 8 shows the fraction of 0-TM cation clusters in simulated Li—Mn—O—F compounds under estimated ball-milling conditions (MC 2573K) as well as in the random limit (infinite temperature limit). When comparing the 0-TM occurrence in HLF67, HLF50, and HLF33, it was determined that fluorination generally leads to a higher fraction of $Li_4$ configuration because of the preference of LiF bond formation over MnF bond formation. On the other hand, LLF67, with a lower Li content presents a larger fraction 0-TM tetrahedron than HLF33, and larger even than that in the random limit. Though this seems to contradict experimental observations, it is noted that the number of 0-TM tetrahedra cannot be directly related to the amount of percolating Li per formula unit. FIG. 9 presents the amount of Li connected to the percolating network. It can be seen that the amount of percolating Li increases from HLF67 to HLF50 to HLF33; whereas LLF67 shows a noticeably smaller amount of percolating Li. This is consistent with the experiment results.

The different trends of 0-TM occurrence and percolating Li amounts in the synthesized compounds originate from the different connectivity of 0-TM tetrahedrons. Based on the percolation theory[8, 18], isolated Li-rich clusters, even though rich in 0-TM units, provide only limited contributions to the overall Li percolation, and Li diffusion throughout the bulk materials becomes facile only when it is presented in a 0-TM unit that is connected to the percolating Li network.

Figure 10:
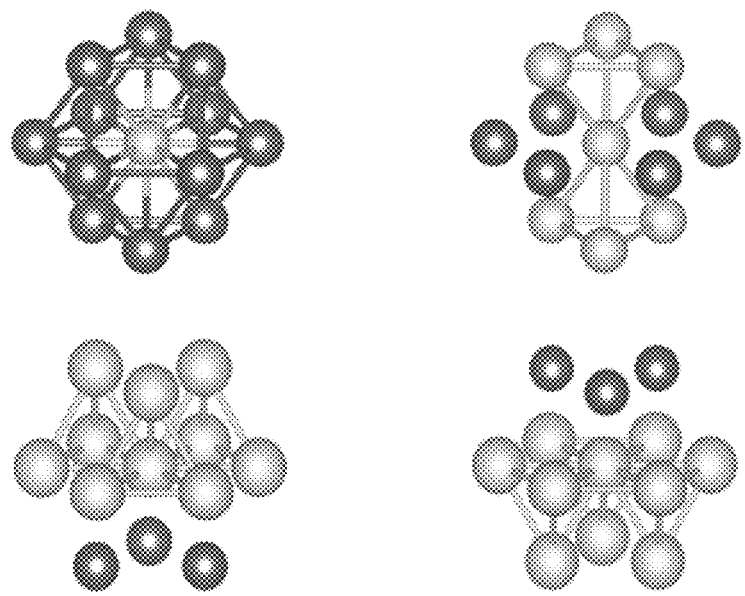
FIG. 10 shows a localized Li cluster configuration in which the Li is shared by eight 0-TM tetrahedrons, with top and bottom tetrahedrons, three upper tetrahedrons, and three lower tetrahedrons.
Figure 11:
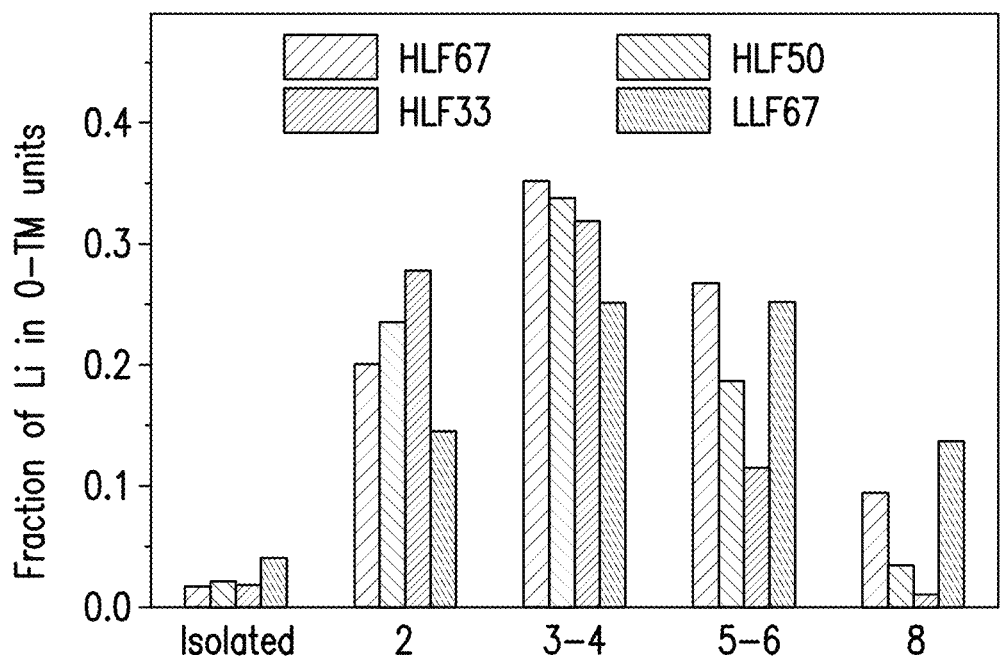
FIG. 11 shows the distribution of different bonding environments around Li present in 0-TM tetrahedrons in compositions according to the present invention.

FIG. 10 shows a localized Li cluster configuration in which the Li is shared by eight 0-TM tetrahedrons at the same time. As shown, top and bottom tetrahedrons, three upper tetrahedrons, and three lower tetrahedrons, will trap much of the Li within small domains, which reduces the efficiency of 0-TM connectivity. FIG. 11 shows the distribution of different bonding environments around Li present in 0-TM tetrahedrons, with the x-axis representing the number of 0-TM units that share a single Li. In the case of HLF67 and LLF67, a larger fraction of 0-TM Li is shared by more than five 0-TM units, whereas for HLF50 and HLF33, a larger fraction of the 0-TM Li is shared by two to four 0-TM units, which is a more efficient way to connect all the 0-TM tetrahedrons. To sum up, the overall percolation property of the DRX oxides or oxyfluorides is related to both the number and connectivity of 0-TM tetrahedrons, which can be modified through compositional design, such as Li-excess level, Li-to-F ratio, and transition metal species.

Figure 12:
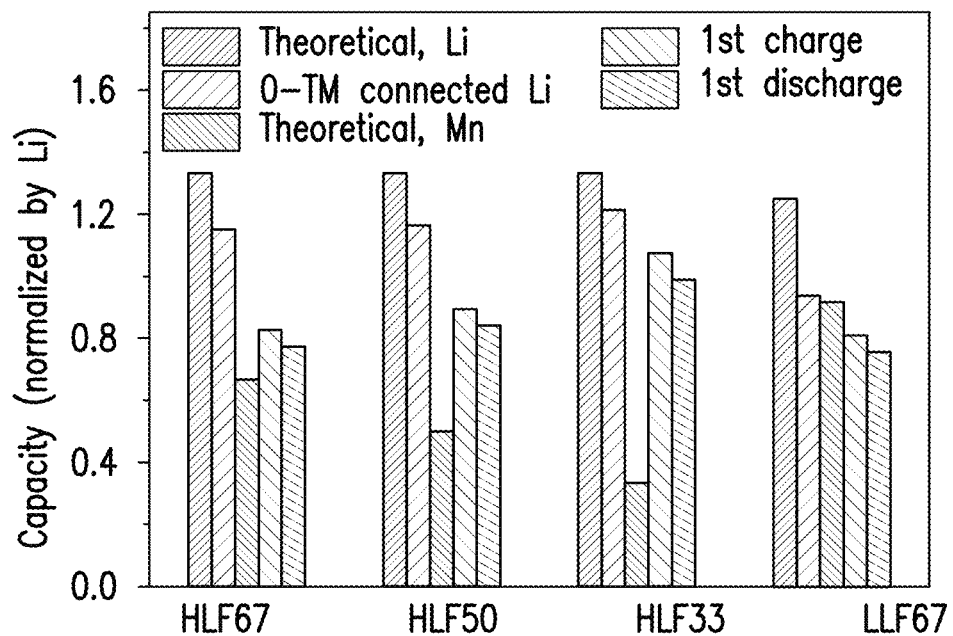
FIG. 12 a comparison of theoretical Li/Mn-redox capacities, 0-TM capacities (i.e., percolating Li capacities) predicted by MC simulations, and experimental capacities of compositions according to the present invention.

Though it is considered that both TM capacity and Li-site distribution can significantly affect cycling performance of the Li—Mn—O—F compounds, their effects appear in different manners. FIG. 12 summarizes the theoretical Li/Mn-redox capacities, 0-TM capacities (i.e., percolating Li capacities) predicted by MC simulations, and experimental capacities obtained from the first charge/discharge at 20 mA g$^{-1}$ and room temperature within the voltage window of 1.5-4.8 V for the synthesized Li—Mn—O—F compounds. Comparing HLF67, HLF50, and HLF33, it is seen that, with increasing amounts of percolating Li, the experimental initial charge/discharge capacities of the compounds increase, even though the Mn-redox capacity decreases. The LLF67 compound, which had the lowest theoretical Li capacity and highest Mn-redox capacity, was found to have the lowest initial charge/discharge capacities among these four samples. These results indicate that the initial capacities of the materials are related to the Li percolation properties, while the Mn-redox capacities strongly influence the capacity decay of the materials. As seen in FIGS. 5a-5d and 6a-6d, increasing Mn-redox capacities was observed to yield improved capacity retention, with capacity retention being observed, from greatest to worst, in the order of LLF67>HLF67>HLF50>HLF33.

Figure 13:
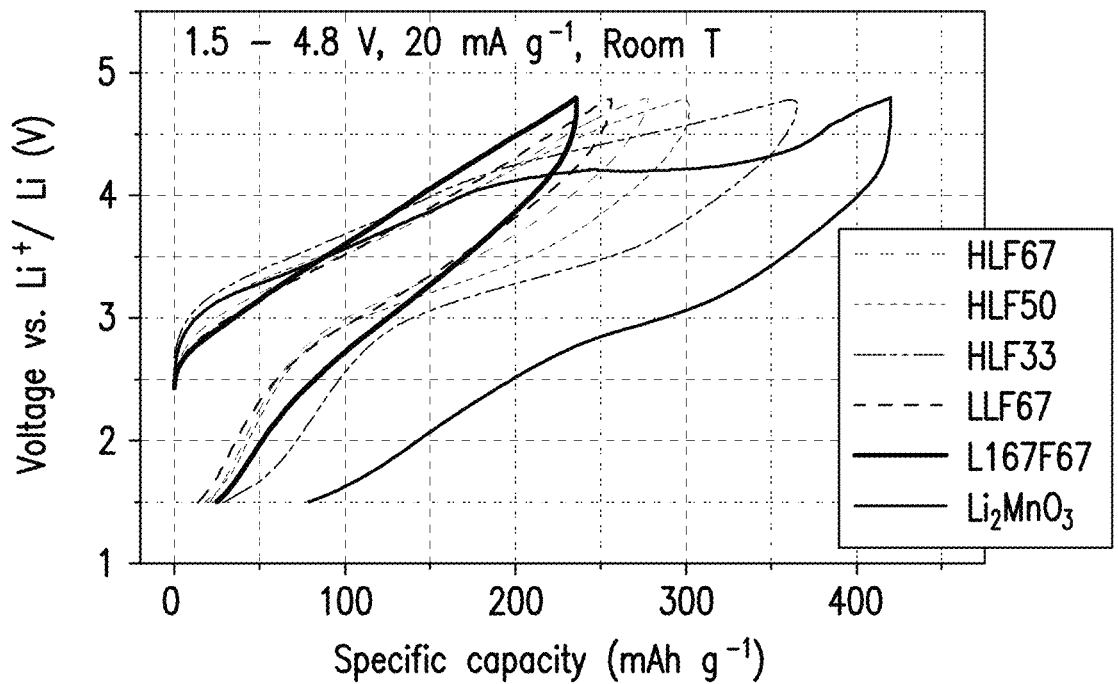
FIG. 13 shows comparative voltage profiles of compositions according to the present invention, in a cycling range of 1.5-4.8 V.
Figure 14:
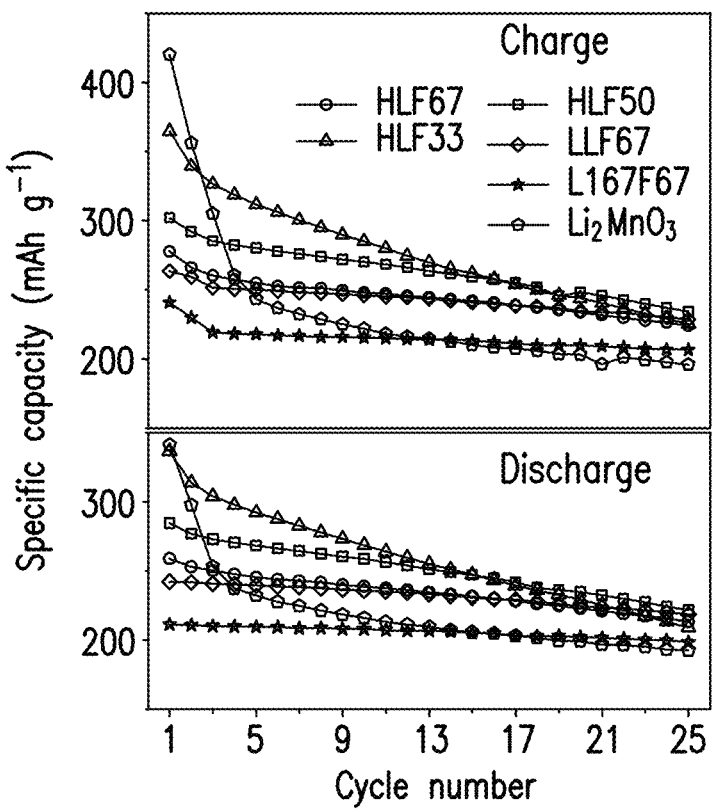
FIG. 14 shows comparative cyclability profiles of compositions according to the present invention, in a cycling range of 1.5-4.8 V.

Further analysis was made of a sample of DRX-Li$_2$MnO$_3$, with more than 95% of percolating Li, and a sample of L167F67, with a high theoretical Mn-redox capacity matching the theoretical Li capacity. Both samples were synthesized using the same mechanochemical ball-milling method discussed above. The voltage profiles (first cycle) and cyclability of the studied compounds are presented in FIGS. 13 and 14, respectively. DRX-Li$_2$MnO$_3$ exhibited the highest initial charge capacity but the worst capacity retention, whereas L167F67F presented the opposite behavior, which is consistent with the foregoing analysis.

Figure 15:
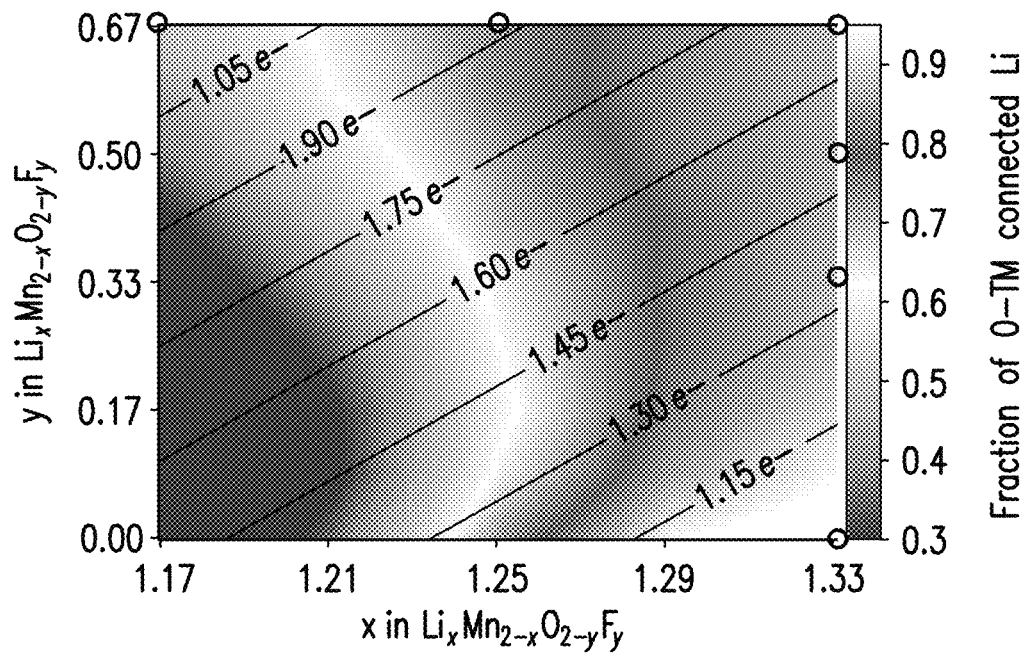
FIG. 15 shows a capacity map for the defined Li—Mn—O—F DRX chemical space.

FIG. 15 presents a capacity map covering the whole composition space of Li—Mn—O—F DRX, (Li$_x$Mn$_{2-x}$O$_{2-y}$F$_y$; 1.1≤x≤1.3333; 0≤y≤0.6667), as informed from the experimental observations. The shading scale illustrates the mapped fraction of accessible Li through the 0-TM percolation network, and the solid lines indicate the theoretical Mn-redox capacity. The synthesized compounds of the present invention are plotted along the periphery of the mapped space.

As observed from the mapped space in FIG. 15, while at a fixed F content, the fraction of percolating Li increases at higher Li contents, while the percolation properties as a function of F content with fixed Li-excess appear more complicated. In general, at a certain Li content, upon increasing F content, the fraction of percolating Li decreases at the beginning, and then increases. This trend intuitively makes sense because, at a certain Li content, when the fluorination level is low, the presence of F ions attracts Li around them, forming Li-rich clusters—however, the F content is not high enough for those Li-rich clusters to connect with each other, so some Li-rich clusters will be isolated and result in a low efficiency of Li connectivity, and thus less percolating Li. When the F content further increases, the Li-rich clusters around F start to connect together, so the overall percolation improves. While not being bound by theory, it is expected that especially preferred candidate compounds in the Li—Mn—O—F composition, as characterized by both large 0-TM Li capacity and adequate Mn-redox capacity, will be found in the bottom right area of the mapped space.

The present findings reveal there is great potential in the Li—Mn—O—F DRX oxide or oxyfluoride chemical space, as informed by the observation that Li-site distribution plays a more important role in determining initial capacities, whereas metal redox capacity is more important for determining cyclability. The capacity map in FIG. 15 presents one example of this potential, with an illustration of relative Li percolation properties and Mn redox capacities.

Though the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

While disclosed methods may be performed by performing all of the disclosed steps in the precise order disclosed, without any intermediate steps, those skilled in the art will appreciate that methods may also be performed: with further steps interposed between the disclosed steps; with the disclosed steps performed in an order other than the exact order disclosed; with one or more disclosed steps performed simultaneously; and with one or more disclosed steps omitted.

To the extent necessary to understand or complete the disclosure of the present invention, all publications, patents, and patent applications mentioned herein are expressly incorporated by reference herein to the same extent as though each were individually so incorporated. Ranges expressed in the disclosure include the endpoints of each range, all values in between the endpoints, and all intermediate ranges subsumed by the endpoints. The terminology used herein is for the purpose of describing particular embodiments only and is not intended to be limiting of the disclosure. As used herein, the singular forms "a", "an" and The present invention is characterized by the appended claims.

CITED REFERENCES

1 Kang, B., et al. Battery materials for ultrafast charging and discharging. *Nature* 458, 190 (2009).
2 P. Barpanda, et al. *Nature materials* 10, 772-779 (2011).
3 Kang, K. , et al. Electrodes with high power and high capacity for rechargeable lithium batteries. *Science* 311, 977-980 (2006).
4 Freire, M. et al. A new active Li—Mn—O compound for high energy density Li-ion batteries. *Nature materials* 15, 173 (2016).
5 House, R. A. et al. Lithium manganese oxyfluoride as a new cathode material exhibiting oxygen redox. *Energy & Environmental Science* 11, 926-932 (2018).
6 Lee, J. et al. Reversible Mn$^{2+}$/Mn$^{4+}$ double redox in lithium-excess cathode materials. *Nature* 556, 185-190, doi:10.1038/s41586-018-0015-4 (2018).
7 Kitchaev, D. A. et al. Design principles for high transition metal capacity in disordered rocksalt Li-ion cathodes. *Energy & Environmental Science* 11, 2159-2171, doi:10.1039/C8EE00816G (2018).

8 Lee, J. et al. Unlocking the potential of cation-disordered oxides for rechargeable lithium batteries. *Science* 343, 519-522 (2014).
9 Glazier, S, et al. Characterization of disordered $Li_{(1+x)}Ti_{2x}Fe_{(1-3x)}O_2$ as positive electrode materials in Li-Ion batteries using percolation theory. *Chemistry of Materials* 27, 7751-7756 (2015).
10 Chen, R. et al. Disordered Lithium-Rich Oxyfluoride as a Stable Host for Enhanced Li+ Intercalation Storage. *Advanced Energy Materials* 5, 1401814-n/a, doi: 10.1002/aenm.201401814 (2015).
11 Lun, Z. et al. Improved Cycling Performance of Li-Excess Cation-Disordered Cathode Materials upon Fluorine Substitution. *Advanced Energy Materials* 9, 1802959, doi:doi:10.1002/aenm.201802959 (2019).
12 Hoshino, S. et al. Reversible three-electron redox reaction of Mo3+/Mo6+ for rechargeable lithium batteries. *ACS Energy Letters* 2, 733-738 (2017).
13 Yabuuchi, N. et al. High-capacity electrode materials for rechargeable lithium batteries: $Li_3NbO_4$-based system with cation-disordered rocksalt structure. *Proceedings of the National Academy of Sciences* 112, 7650-7655, doi:10.1073/pnas.1504901112 (2015).
14 Lee, J. et al. Mitigating oxygen loss to improve the cycling performance of high capacity cation-disordered cathode materials. *Nature communications* 8, 981 (2017).
15 Ji, H. et al. Hidden structural and chemical order controls lithium transport in cation-disordered oxides for rechargeable batteries. *Nature Communications* 10, 592, doi:10.1038/s41467-019-08490-w (2019).
16 Clément, R. J., Kitchaev, D., Lee, J. & Gerbrand, C. Short-Range Order and Unusual Modes of Nickel Redox in a Fluorine-Substituted Disordered Rocksalt Oxide Lithium-Ion Cathode. *Chemistry of Materials* 30, 6945-6956, doi:10.1021/acs.chemmater.8b03794 (2018).
17 Kan, W. H. et al. Understanding the Effect of Local Short-Range Ordering on Lithium Diffusion in $Li1.3Nb0.3Mn_{0.4}O2$ Single-Crystal Cathode. *Chem.*
18 Urban, A., et al. The Configurational Space of Rocksalt—Type Oxides for High-Capacity Lithium Battery Electrodes. *Advanced Energy Materials* 4 (2014).
19 Richards, W. D., Dacek, S. T., Kitchaev, D. A. & Ceder, G. Fluorination of Lithium-Excess Transition Metal Oxide Cathode Materials. *Advanced Energy Materials* 8, 1701533, doi:doi:10.1002/aenm.201701533 (2018).
20 Nelson, L. J., Hart, G. L. W., Zhou, F. & Ozoliņš, V. Compressive sensing as a paradigm for building physics models. *Physical Review B* 87, 035125, doi: 10.1103/PhysRevB.87.035125 (2013).
21 Kresse, G. & Furthmüller, J. Efficiency of ab-initio total energy calculations for metals and semiconductors using a plane-wave basis set. *Computational Materials Science* 6, 15-50, doi:https://doi.org/10.1016/0927-0256(96)00008-0, (1996).
22 Kresse, G. & Joubert, D. From ultrasoft pseudopotentials to the projector augmented-wave method. *Physical Review B* 59, 1758-1775, doi:10.1103/PhysRevB.59.1758 (1999).
23 Dudarev, S. L., Botton, G. A., Savrasov, S. Y., Humphreys, C. J. & Sutton, A. P. Electron-energy-loss spectra and the structural stability of nickel oxide: An LSDA+U study. *Physical Review B* 57, 1505-1509, doi:10.1103/PhysRevB.57.1505 (1998).
24 Wang, L., Maxisch, T. & Ceder, G. Oxidation energies of transition metal oxides within the $ \mathrm{GGA}+\mathrm{U}$ framework. *Physical Review B* 73, 195107, doi:10.1103/PhysRevB.73.195107 (2006).
25 Metropolis, N., Rosenbluth, A. W., Rosenbluth, M. N., Teller, A. H. & Teller, E. Equation of State Calculations by Fast Computing Machines. *The Journal of Chemical Physics* 21, 1087-1092, doi:10.1063/1.1699114 (1953).
26 Hastings, W. K. Monte Carlo sampling methods using Markov chains and their applications. *Biometrika* 57, 97-109, doi:10.1093/biomet/57.1.97 (1970).
27 Sun, J., Ruzsinszky, A. & Perdew, J. P. Strongly Constrained and Appropriately Normed Semilocal Density Functional. *Physical Review Letters* 115, 036402, doi:10.1103/PhysRevLett.115.036402 (2015).
28 Kitchaev, D. A. et al. Energetics of ${\mathrm{MnO}}_{2}$ polymorphs in density functional theory. *Physical Review B* 93, 045132, doi: 10.1103/PhysRevB.93.045132 (2016).
29 Zhang, Y. et al. Efficient first-principles prediction of solid stability: Towards chemical accuracy. *npj Computational Materials* 4, 9, doi:10.1038/s41524-018-0065-z (2018).

What is claimed is:

1. A lithium metal oxide or oxyfluoride compound having a general formula:
   $Li_xMn_{2-x}O_{2-y}F_y$, wherein $1.1 \le x \le 1.3333$, $0 > y \le 0.6667$, and wherein Mn is present in a single oxidation state of Mn(III).

2. The compound of claim 1, wherein the compound is $Li_{1.3333}Mn(III)_{0.6667}O_{1.3333}F_{0.6667}$.

3. The compound of claim 1, wherein the compound has a cation-disordered rocksalt (DRX) structure.

4. The compound of claim 3, wherein the DRX structure is adapted for low-energy Li migration through 0-TM channels.

5. The compound of claim 3, wherein the DRX structure has a lattice constant between 4.1477 Å and 4.1635 Å.

6. The compound of claim 1, wherein the compound is adapted to utilize $O_2$ and/or Mn redox during charge and discharge phases.

7. The compound of claim 1, wherein the compound exhibits, over 30 cycles in a range of 1.5-4.8 V, an average capacity from 242 to 336 mAh $g^{-1}$.

8. The compound of claim 1, wherein the compound exhibits, over 30 cycles in a range of 1.5-4.8 V, a specific energy from 771 to 1059 Wh $kg^{-1}$.

9. The compound of claim 1, wherein the compound exhibits, over 30 cycles in a range of 1.5-5.0 V, an average capacity from 256 to 349 mAh $g^{-1}$.

10. The compound of claim 1, wherein the compound exhibits, over 30 cycles in a range of 1.5-5.0 V, a specific energy from 822 to 1068 Wh $kg^{-1}$.

11. An electrode material, comprising:
    a compound according to claim 1.

12. A lithium-ion battery, comprising:
    an electrolyte; and
    the electrode material of claim 11.

13. The lithium-ion battery of claim 12, wherein the electrode material forms a cathode.

14. The lithium-ion battery of claim 13, wherein the cathode is a cathode film comprising the electrode material, a conductive additive, and polytetrafluoroethylene (PTFE) at a weight ratio of 70:20:10, respectively.

15. A portable electronic device, an automobile, or an energy storage system, comprising:
    the lithium-ion battery of claim 12.

16. A lithium-ion battery, comprising:
an electrolyte; an anode; and a cathode, wherein at least one of the electrolyte, the anode, and the cathode is composed, at least in part, of a compound according to claim 1.

17. A method of making a compound according to claim 1, comprising
combining a collection of stoichiometric compounds composed of Li, Mn, O, and F to yield a precursor powder; and
mechanically mixing the precursor powder to obtain the phase pure powder through mechanochemical alloying.

18. The method according to claim 17, wherein the collection of stoichiometric compounds composed of Li, Mn, O, and F comprises one or more of: $Li_2O$, MnO, $Mn_2O_3$, $MnO_2$, and LiF.

19. The compound of claim 1, wherein $1.25 \leq x \leq 1.3333$.

20. A lithium metal oxide or oxyfluoride compound having a general formula:
$Li_xMn_{2-x}O_{2-y}F_y$, wherein $1.1 \leq x \leq 1.3333$, $0 \leq y \leq 0.6667$, and wherein Mn is present in a combination of multiple oxidation states.

21. The compound of claim 20, wherein the compound is $Li_{1.3333}Mn(III)_{0.5}Mn(IV)_{0.1667}O_{1.5}F_{0.5}$.

22. The compound of claim 20, wherein the compound is $Li_{1.3333}Mn(III)_{0.3333}Mn(IV)_{0.3333}O_{1.6667}F_{0.3333}$.

23. The compound of claim 20, wherein the compound is $Li_{1.25}MN(II)_{0.1667}MN(III)_{0.5833}O_{1.3333}F_{0.6667}$.

24. The compound of claim 20, wherein the compound is $Li_{1.1667}Mn(II)_{0.3333}Mn(III)_{0.5}O_{1.3333}F_{0.6667}$.

25. The compound of claim 20, wherein Mn comprises a redox couple of Mn in multiple oxidation states.

26. The compound of claim 25, wherein the redox couple comprises Mn(III).

27. The compound of claim 20, wherein the compound has a cation-disordered rocksalt (DRX) structure.

28. The compound of claim 27, wherein the DRX structure is adapted for low-energy Li migration through 0-TM channels.

29. The compound of claim 27, wherein the DRX structure has a lattice constant between 4.1477 Å and 4.1635 Å.

30. The compound of claim 20, wherein the compound is adapted to utilize $O_2$ and/or Mn redox during charge and discharge phases.

31. The compound of claim 20, wherein the compound exhibits, over 30 cycles in a range of 1.5-4.8 V, an average capacity from 242 to 336 mAh $g^{-1}$.

32. The compound of claim 20, wherein the compound exhibits, over 30 cycles in a range of 1.5-4.8 V, a specific energy from 771 to 1059 Wh $kg^{-1}$.

33. The compound of claim 20, wherein the compound exhibits, over 30 cycles in a range of 1.5-5.0 V, an average capacity from 256 to 349 mAh $g^{-1}$.

34. The compound of claim 20, wherein the compound exhibits, over 30 cycles in a range of 1.5-5.0 V, a specific energy from 822 to 1068 Wh $kg^{-1}$.

35. An electrode material, comprising:
a compound according to claim 20.

36. A lithium-ion battery, comprising:
an electrolyte; and
the electrode material of claim 35.

37. The lithium-ion battery of claim 36, wherein the electrode material forms a cathode.

38. The lithium-ion battery of claim 37, wherein the cathode is a cathode film comprising the electrode material, a conductive additive, and polytetrafluoroethylene (PTFE) at a weight ratio of 70:20:10, respectively.

39. A lithium-ion battery, comprising:
an electrolyte; an anode; and a cathode, wherein
at least one of the electrolyte, the anode, and the cathode is composed, at least in part, of a compound according to claim 20.

40. A portable electronic device, an automobile, or an energy storage system, comprising:
the lithium-ion battery of claim 36.

41. A method of making a compound according to claim 20, comprising
combining a collection of stoichiometric compounds composed of Li, Mn, O, and F to yield a precursor powder; and
mechanically mixing the precursor powder to obtain the phase pure powder through mechanochemical alloying.

42. The method according to claim 41, wherein the collection of stoichiometric compounds composed of Li, Mn, O, and F comprises one or more of: $Li_2O$, MnO, $Mn_2O_3$, $MnO_2$, and LiF.

43. The compound of claim 20, wherein $1.25 \leq x \leq 1.3333$.

* * * * *